United States Patent
Yoo et al.

(10) Patent No.: US 10,152,540 B2
(45) Date of Patent: Dec. 11, 2018

(54) LINKING THUMBNAIL OF IMAGE TO WEB PAGE

(71) Applicant: QUALCOMM Incorporated, San Diego, CA (US)

(72) Inventors: Seungwoo Yoo, Seongnam (KR); Duck Hoon Kim, Seoul (KR); Young-Ki Baik, Seoul (KR); Kang Kim, Seoul (KR); Seok-Soo Hong, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 14/690,163

(22) Filed: Apr. 17, 2015

(65) Prior Publication Data
US 2016/0103915 A1    Apr. 14, 2016

Related U.S. Application Data

(60) Provisional application No. 62/062,715, filed on Oct. 10, 2014.

(51) Int. Cl.
*G06F 17/00* (2006.01)
*G06F 17/30* (2006.01)
*G06F 17/22* (2006.01)
*G06K 9/32* (2006.01)

(52) U.S. Cl.
CPC .... *G06F 17/30864* (2013.01); *G06F 17/2235* (2013.01); *G06F 17/30253* (2013.01); *G06F 17/30882* (2013.01); *G06K 9/325* (2013.01); *G06K 2209/01* (2013.01)

(58) Field of Classification Search
CPC ......... G06F 17/30893; G06F 17/30896; G06F 17/30864; G06F 17/2235; G06F 17/30253

USPC ................................................... 715/205, 255
See application file for complete search history.

(56) References Cited

U.S. PATENT DOCUMENTS

| | | | | |
|---|---|---|---|---|
| 6,665,838 | B1* | 12/2003 | Brown | G06F 17/30864 707/E17.111 |
| 7,167,875 | B2* | 1/2007 | Brown | G06F 17/30864 |
| 7,299,222 | B1* | 11/2007 | Hogan | G06F 17/30864 |
| 7,685,191 | B1* | 3/2010 | Zwicky | G06Q 30/02 707/706 |
| 7,685,426 | B2* | 3/2010 | Ramos | G06F 17/30884 380/1 |

(Continued)

FOREIGN PATENT DOCUMENTS

WO    2010120901 A1    10/2010
WO    2012075315 A1    6/2012

OTHER PUBLICATIONS

Cockburn et al., Faster Document Navigation with Space-Filling Thumbnails, ACM 2006, pp. 1-10.*

(Continued)

*Primary Examiner* — Cong-Lac Huynh
(74) *Attorney, Agent, or Firm* — Toler Law Group, PC

(57) ABSTRACT

A method, performed by an electronic device, for linking a thumbnail of an image and at least one web page is disclosed. In this method, the image including at least one text region may be accessed in a storage unit. At least one text region may be detected in the image and at least one character string in the at least one text region may be recognized. Further, the method may include selecting the at least one web page from the plurality of web pages and linking the thumbnail of the image and the at least one web page.

30 Claims, 12 Drawing Sheets

(56) References Cited

U.S. PATENT DOCUMENTS

| | | | | |
|---|---|---|---|---|
| 8,185,604 | B2* | 5/2012 | Forrester | G06Q 30/0603 |
| | | | | 709/217 |
| 8,306,969 | B2* | 11/2012 | Beaudreau | G06F 17/30867 |
| | | | | 707/722 |
| 8,385,589 | B2 | 2/2013 | Erol et al. | |
| 8,566,712 | B1* | 10/2013 | Varian | G06F 17/30867 |
| | | | | 715/234 |
| 9,002,831 | B1* | 4/2015 | O'Malley | G06F 17/30864 |
| | | | | 707/723 |
| 9,031,960 | B1* | 5/2015 | Wang | G06F 17/30864 |
| | | | | 707/723 |
| 9,305,094 | B2* | 4/2016 | Bastide | G06F 17/30864 |
| 9,348,939 | B2* | 5/2016 | Andrade | G06F 17/30905 |
| 9,460,062 | B2* | 10/2016 | Antipa | G06F 17/2247 |
| 9,934,316 | B2* | 4/2018 | Mohapatra | G06F 17/30873 |
| 2002/0010718 | A1* | 1/2002 | Miller | G06F 3/0481 |
| | | | | 715/273 |
| 2002/0135621 | A1* | 9/2002 | Angiulo | G06F 17/3089 |
| | | | | 715/838 |
| 2003/0018667 | A1* | 1/2003 | Hoehn | G06F 17/30873 |
| | | | | 715/234 |
| 2004/0049728 | A1* | 3/2004 | Langford | G06F 17/30873 |
| | | | | 715/205 |
| 2004/0215660 | A1* | 10/2004 | Ikeda | G06F 17/30277 |
| 2005/0246296 | A1* | 11/2005 | Ma | G06F 17/30867 |
| | | | | 706/12 |
| 2006/0002607 | A1 | 1/2006 | Boncyk et al. | |
| 2006/0085477 | A1 | 4/2006 | Phillips et al. | |
| 2006/0227992 | A1 | 10/2006 | Rathus et al. | |
| 2007/0027839 | A1* | 2/2007 | Ives | G06F 17/30905 |
| 2007/0226321 | A1 | 9/2007 | Bengtson | |
| 2008/0005668 | A1* | 1/2008 | Mavinkurve | G06F 3/0481 |
| | | | | 715/764 |
| 2008/0027928 | A1* | 1/2008 | Larson | G06F 17/30864 |
| 2008/0140712 | A1* | 6/2008 | Weber | G06F 17/30864 |
| 2008/0182555 | A1* | 7/2008 | Madanes | H04M 3/4931 |
| | | | | 455/411 |
| 2009/0064003 | A1* | 3/2009 | Harris | G06F 17/3089 |
| | | | | 715/763 |
| 2010/0095219 | A1* | 4/2010 | Stachowiak | G06F 17/30884 |
| | | | | 715/745 |
| 2010/0125568 | A1* | 5/2010 | van Zwol | G06K 9/46 |
| | | | | 707/722 |
| 2010/0131488 | A1* | 5/2010 | Dasdan | G06F 17/30864 |
| | | | | 707/709 |
| 2010/0260373 | A1 | 10/2010 | Neven et al. | |
| 2011/0029561 | A1* | 2/2011 | Slaney | G06F 17/30247 |
| | | | | 707/772 |
| 2012/0016741 | A1* | 1/2012 | Brunsman | G06Q 30/00 |
| | | | | 705/14.49 |
| 2012/0054239 | A1 | 3/2012 | Chung et al. | |
| 2012/0075295 | A1* | 3/2012 | Aoki | G06F 17/30905 |
| | | | | 345/419 |
| 2013/0188872 | A1* | 7/2013 | Masuko | G06F 17/30253 |
| | | | | 382/182 |
| 2013/0275408 | A1* | 10/2013 | Rodriguez | G06F 17/30991 |
| | | | | 707/722 |
| 2013/0275577 | A1* | 10/2013 | Lim | H04L 43/06 |
| | | | | 709/224 |
| 2013/0339804 | A1 | 12/2013 | Greiner et al. | |
| 2013/0339840 | A1* | 12/2013 | Jain | G06F 17/2247 |
| | | | | 715/234 |
| 2014/0055814 | A1* | 2/2014 | Eguchi | H04N 1/00405 |
| | | | | 358/1.15 |
| 2014/0129625 | A1* | 5/2014 | Haugen | H04W 4/08 |
| | | | | 709/204 |
| 2014/0133756 | A1* | 5/2014 | Bergboer | G06K 9/00677 |
| | | | | 382/190 |
| 2014/0172884 | A1* | 6/2014 | Wang | G06F 17/30253 |
| | | | | 707/749 |
| 2014/0188927 | A1* | 7/2014 | Moxley | G06F 17/30864 |
| | | | | 707/769 |
| 2014/0337712 | A1* | 11/2014 | Park | H04M 1/72544 |
| | | | | 715/234 |
| 2015/0074512 | A1* | 3/2015 | Everingham | G06F 17/30893 |
| | | | | 715/234 |
| 2015/0088664 | A1* | 3/2015 | Sano | G06F 17/30864 |
| | | | | 705/14.69 |
| 2015/0113375 | A1* | 4/2015 | Li | G06F 3/0482 |
| | | | | 715/205 |
| 2015/0161120 | A1* | 6/2015 | Preetham | G06F 17/30247 |
| | | | | 707/728 |
| 2015/0277691 | A1* | 10/2015 | Matas | G06F 3/00 |
| | | | | 715/784 |
| 2016/0004698 | A1* | 1/2016 | Angaluri | G06F 17/3053 |
| | | | | 707/706 |
| 2016/0019620 | A1* | 1/2016 | Bajpai | G06Q 30/0625 |
| | | | | 705/26.62 |
| 2016/0070990 | A1* | 3/2016 | Zhang | G06K 9/74 |
| | | | | 382/218 |
| 2016/0098611 | A1* | 4/2016 | Gray | G06K 9/2054 |
| | | | | 382/229 |
| 2016/0179972 | A1* | 6/2016 | Blackwell | G06F 17/30554 |
| | | | | 707/722 |
| 2016/0180016 | A1* | 6/2016 | Schafer | H05B 37/0272 |
| | | | | 703/17 |
| 2016/0259817 | A1* | 9/2016 | Vijaywargi | G06F 17/30887 |
| 2017/0091330 | A1* | 3/2017 | Lin | G06F 17/30265 |

OTHER PUBLICATIONS

Hendler, Agents and the Semantic Web, IEEE 2001, pp. 31-37.*
Cho et al., Efficient Crawling through URL Ordering, Computer Network 1998, pp. 161-172.*
Woodruff et al., Using Thumbnail to search the Web, ACM 2001, pp. 198-205.*
Woodruff et al., Using Thumbnails to Search the Web, ACM 2001, pp. 198-205.*
Min et al., Early Experiences with a 3D Model Search Engine, ACM 2003, pp. 7-19.*
Morris et al., Tweeting is Believing? Understanding Microblog Credibility Perceptions, ACM 2012, pp. 441-450. (Year: 2012).*
Yeh et al., IDeixis—Image-based Deixis for Finding Location-based Information, ACM 2004, pp. 781-782. (Year: 2004).*
International Search Report and Written Opinion—PCT/US2015/052157—ISA/EPO—dated Dec. 9, 2015, 19 pages.
"Lecture 1: Similarity Searching and Information Retrieval," Aug. 26, 2009 (Aug. 26, 2009), pp. 0-14, XP055229721, Retrieved from the Internet: URL:http://www.stat.cmu.edu/cshalizi/350/lecturesj01/lecture-01.pdf [retrieved on Nov. 19, 2015].

* cited by examiner

LINKING THUMBNAIL OF IMAGE TO WEB PAGE

CROSS-REFERENCE TO RELATED APPLICATION(S)

This application claims the benefit of priority from U.S. Provisional Patent Application No. 62/062,715 entitled "LINKING IMAGE TO WEB PAGE," filed on Oct. 10, 2014, the entire contents of which are incorporated herein by reference.

FIELD OF THE DISCLOSURE

The present disclosure relates generally to image processing, and more specifically, to processing an image including a text object in an electronic device.

DESCRIPTION OF RELATED ART

In recent years, the use of electronic devices such as smartphones, wearable computers, tablet computers, and the like has become widespread. Such electronic devices are often equipped with cameras or camera modules that may be used by a user to capture and store photographs of a variety of types of scenes and objects. Once a photograph has been captured and stored, such electronic devices may allow the user to view and edit the photograph according to his or her preference.

Conventional electronic devices may also provide a function of communicating with an external server or device via a wired or wireless communication network. For example, a user may operate such electronic devices to browse the Internet for information and display the information on the electronic devices. While displaying such information, the user may capture an image of the displayed information and store the image in the electronic devices. Additionally, the user may use such electronic devices to receive a plurality of images (e.g., photographs) that may include text from an external device or server via a communication network for storage.

After storing such images, a user may subsequently select and view the images on the electronic devices. Upon viewing the images, the user may want to search the Internet for information related to the images. In such cases, however, the user typically needs to obtain the information by manually performing search operations on the Internet using the information from the images. Performing such search operations manually may be inconvenient and time consuming for the user.

SUMMARY

The present disclosure relates to linking a thumbnail of an image and at least one web page having contents that are similar to contents of the image.

According to one aspect of the present disclosure, a method, performed by an electronic device, for linking a thumbnail of an image and at least one web page is disclosed. In this method, the image including at least one text region may be accessed in a storage unit. At least one text region may be detected in the image, and at least one character string in the at least one text region may be recognized. Based on the at least one character string, a plurality of web pages may then be searched. The at least one web page may be selected from the plurality of web pages, and the thumbnail of the image and the at least one web page may be linked. This disclosure also describes apparatus, a device, a combination of means, and a computer-readable medium relating to this method.

According to another aspect of the present disclosure, an electronic device for linking a thumbnail of an image and at least one web page is disclosed. The electronic device includes a text region detection unit, a text recognition unit, a web page search unit, a web page selection unit, and an image linking unit. The text region detection unit may be configured to access the image including at least one text region in a storage unit and detect the at least one text region in the image. Further, the text recognition unit may be configured to recognize at least one character string in the at least one text region. The web page search unit may be configured to search a plurality of web pages based on the at least one character string, and the web page selection unit may be configured to select the at least one web page from the plurality of web pages. The image linking unit may be configured to link the thumbnail of the image and the at least one web page.

BRIEF DESCRIPTION OF THE DRAWINGS

Embodiments of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
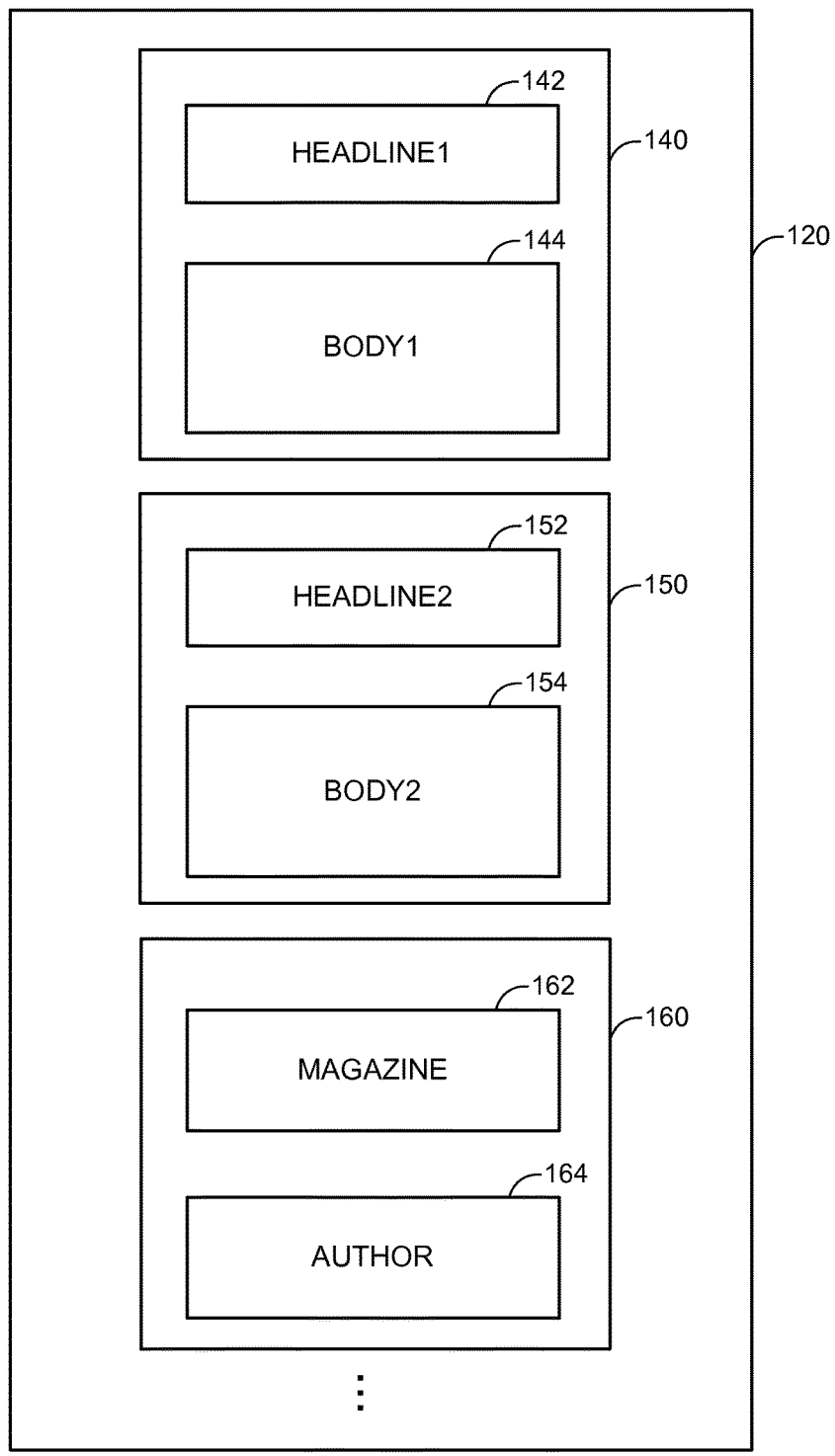
FIG. 1 illustrates an electronic device that may be configured to store and access a plurality of images, according to one embodiment of the present disclosure.

FIG. 1 illustrates an electronic device 120 that may be configured to store and access a plurality of images 140, 150, and 160, according to one embodiment of the present disclosure. The images 140, 150, and 160 may be captured via an image sensor and stored in a storage unit of the electronic device 120 or received from an external device via a communication network. As illustrated herein, the electronic device 120 may be any suitable device equipped with image processing capabilities such as a smartphone, a digital camera (e.g., a DSLR camera), a wearable computer (e.g., smart glasses, a smart watch, etc.), a personal computer, a laptop computer, a tablet computer, a gaming device, etc. Although the electronic device 120 is illustrated as including the images 140, 150, and 160, it may store any suitable number of images in a storage unit of the electronic device 120 or receive such images from an external device.

The images 140, 150, and 160 may include one or more objects such as a text object (e.g., an object including text) and a non-text object (e.g., an object not including text). In FIG. 1, each of the images 140, 150, and 160 may include a text object (e.g., a document, a web page or document, etc.) having at least one text region. For example, the image 140 may include an article having a plurality of text regions 142 and 144, which may include character strings "HEADLINE1" (e.g., a title, a headline, etc.) and "BODY1" (e.g., a body, content, a phrase, a sentence, a paragraph, etc.), respectively. Similarly, the image 150 may include an article having a plurality of text regions 152 and 154, which may include character strings "HEADLINE2" and "BODY2," respectively. Likewise, the image 160 may include a cover of a magazine having a plurality of text regions 162 and 164, which may include character strings "MAGAZINE" and "AUTHOR," respectively. Although the images 140, 150, and 160 are illustrated as documents such as an article and a magazine, they may be images of any objects or items that include or show text such as web pages or documents, street signs, maps, menus, and the like.

The electronic device 120 may be configured to access the images 140 to 160 that include at least one object with text and perform text recognition on the images 140 to 160 to recognize at least one character string in each of the images 140 to 160. In one embodiment, the electronic device 120 may detect at least one text region in each of the images 140 to 160 and recognize the at least one character string in each of the at least one text region. For example, the electronic device 120 may detect the text regions 142 and 144 in the image 140 and recognize the character strings "HEADLINE1" and "BODY1" in the text regions 142 and 144, respectively.

Upon recognizing at least one character string in each of the images 140 to 160, the electronic device 120 may be configured to search a plurality of web pages based on the at least one recognized character string. In one embodiment, the electronic device 120 may generate a search query by selecting at least one word from a plurality of words, which may be included in the at least one character string in each of the images 140 to 160. For example, the electronic device 120 may determine a number of occurrences of words recognized in the at least one character string of the image 140 using any suitable statistical modeling method such as word n-gram, word histogram, or the like, and select at least one word from the words based on the number of occurrences. Upon selecting the at least one word from the at least one character string in the image 140, the electronic device 120 may use the at least one selected word as a search query to search a plurality of web pages using any suitable search engines that may be provided internally or externally via a communication network. As used herein, the term "web page" may refer to any web document associated with an address (e.g., a URL) that is accessible via the Internet or intranet using a browser application and may include text, an image, a map, a video, or any combination thereof. Based on the search, the electronic device 120 may retrieve the plurality of web pages, each of which may be associated with one or more words in the search query for each of the images 140, 150, and 160.

Among the retrieved web pages for each of the images 140 to 160, the electronic device 120 may select at least one web page having contents that are similar to contents of the image from which the search query has been generated. As used herein, the term "content" or "contents" may refer to any data or information that is included in an image or a web page and may also be indicative of layout, characteristics, or arrangement of objects (e.g., text objects, non-text objects, etc.) in the image or the web page. For example, contents for an image or web page may include words, character sizes, stroke widths, locations, types, etc. of one or more text objects. The term "similar" or "similarity" may refer to a degree or value of similarity between contents of an image and a web page that exceeds a specified degree or value of similarity, which may be predetermined. In one embodiment, similarity between an image and a web page may be determined by performing a natural language processing such as a syntactic analysis, a lexical analysis, and/or a semantic analysis, as described in detail with reference to reference numerals 720, 730, and 740 in FIG. 7. For example, the electronic device 120 may search a plurality of web pages associated with the character string "HEADLINE1" in the image 140 and select a web page with the highest similarity among the web pages. Additionally or alternatively, the electronic device 120 may access a plurality of web pages and select a specified number of web pages having a degree or value of similarity that exceeds a threshold similarity value.

After selecting the at least one web page for each of the images 140 to 160, the electronic device 120 may be configured to link a thumbnail of each of the images 140 to 160 and the at least one web page. In one embodiment, the electronic device 120 may generate a plurality of thumbnails of the original images 140, 150, and 160 and display the thumbnails on a display screen of the electronic device 120. As used herein, the term "thumbnail" may refer to a reduced-size image or a portion of an original image. In one embodiment, if the number of the at least one web page that has been searched and selected for an image is one, the electronic device 120 may link the thumbnail of the image or a portion of the thumbnail such as a recognized character string to the web page. In another embodiment, if two or more web pages have been searched and selected, the electronic device 120 may generate a list of the selected web pages, which may then be linked to the thumbnail of the image or a portion of the thumbnail such as a recognized character string. In this manner, each of the thumbnails of images 140, 150, and 160 in FIG. 1 or a portion (e.g., a character string) in each of the thumbnails may be linked to one or more web pages. According to some embodiments, a thumbnail of an image or a recognized character string in the thumbnail may be linked to one or more web pages by tagging link information (e.g., one or more URLs or the like) for the web pages to the thumbnail as metadata of the thumbnail.

Figure 2:
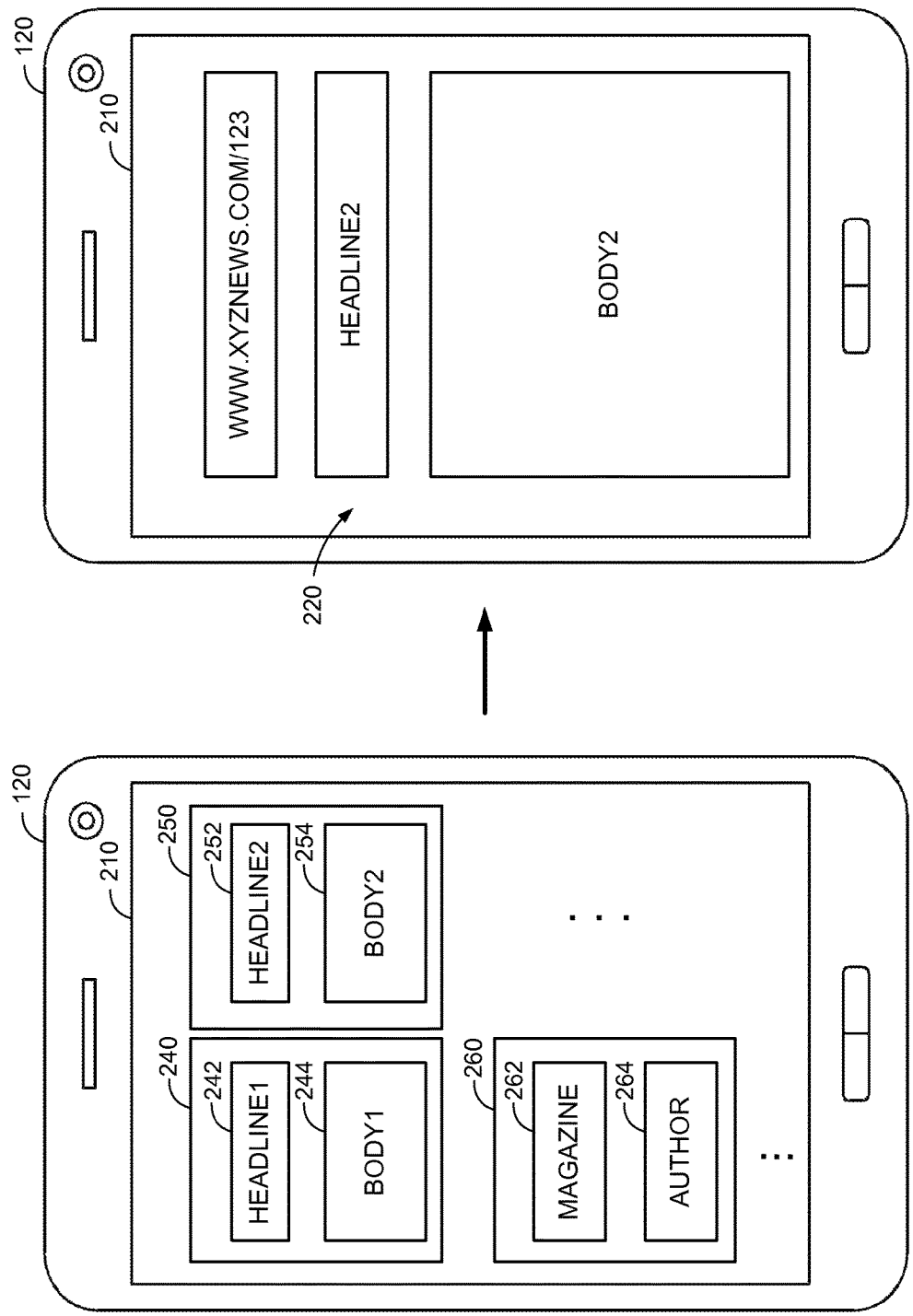
FIG. 2 depicts a flow diagram of selecting a thumbnail from a plurality of thumbnails associated with a plurality of images, respectively, in an electronic device and accessing a web page associated with the selected thumbnail, according to one embodiment of the present disclosure.

Once a thumbnail of an image or a portion in the thumbnail has been linked to one or more web pages, the thumbnail may be selected to access the one or more web pages linked to the thumbnail. FIG. 2 illustrates selecting a thumbnail 250 from a plurality of thumbnails 240, 250, and 260 associated with the images 140, 150, and 160, respectively, in the electronic device 120 in FIG. 1 and accessing a web page 220 associated with the selected thumbnail 250, according to one embodiment of the present disclosure. Initially, the electronic device 120 may display the plurality of thumbnails 240, 250, and 260 on a display screen 210 of the electronic device 120. Among the thumbnails 240, 250, and 260, a user of the electronic device 120 may select the thumbnail 250, which includes the plurality of text regions 252 and 254. In one embodiment, the user may select the thumbnail 250 or a portion of the thumbnail 250 (e.g., a character string in the text regions 252 or 254) on the display screen 210, which may be a touch-sensitive screen.

Upon selecting the thumbnail 250 or the portion of the thumbnail 250 on the display screen 210, the electronic device 120 may access the web page 220 that has been linked to the thumbnail 250 via a communication network and display the web page 220 on the display screen 210. Since the web page 220 has been selected and linked based on similarity to the thumbnail 250, contents of the web page 220 may be substantially similar to contents of the thumbnail 250 and include the character strings "HEADLINE2" and "BODY2" of the thumbnail 250. Alternatively, the electronic device 120 may display a list of web pages associated with the thumbnail 250 if a plurality of web pages is selected and linked to the thumbnail 250. The list of web pages may include link information for the web pages. From the list of web pages, the user may select one of the web pages to access the selected web page.

Figure 3:
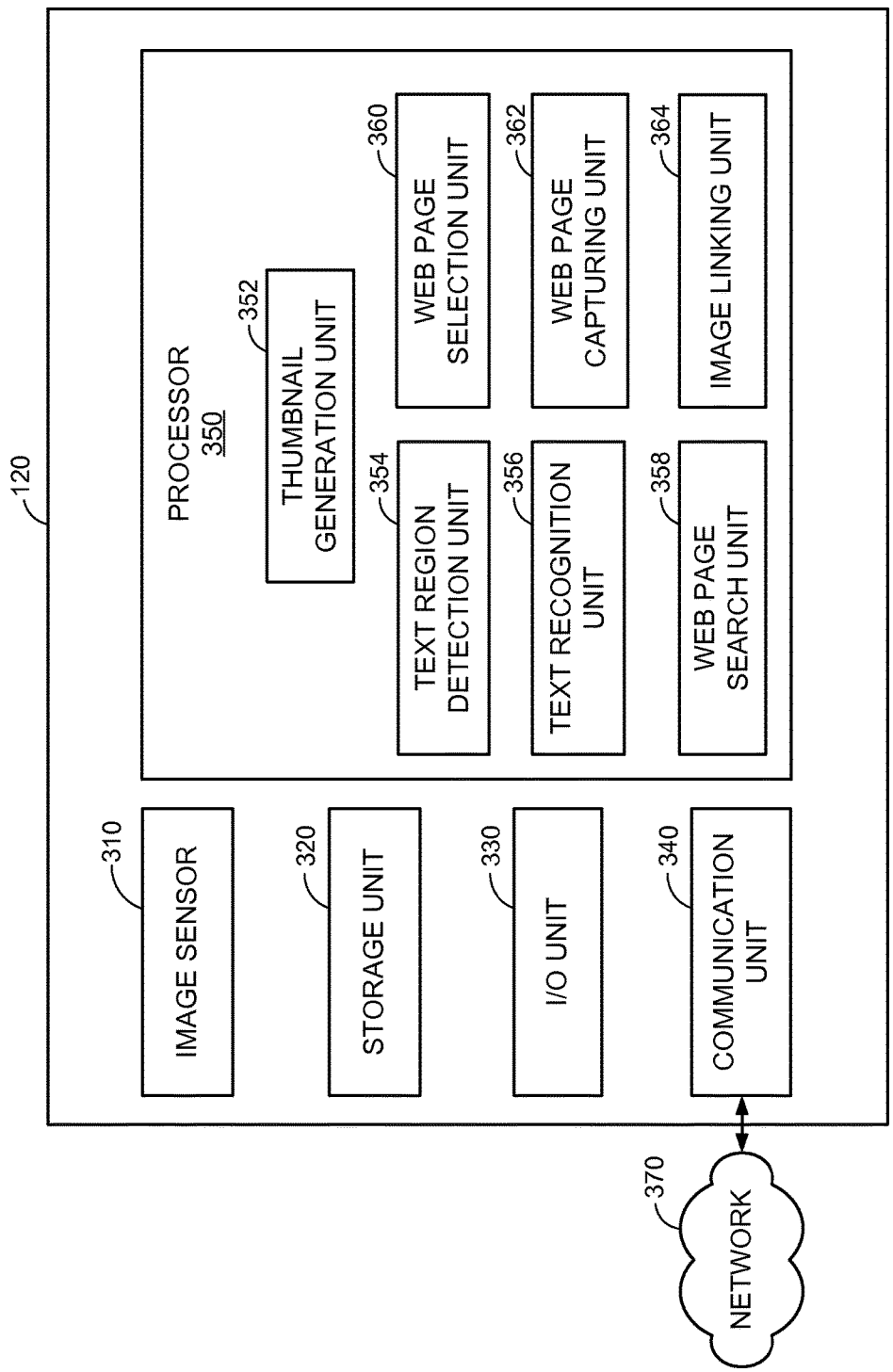
FIG. 3 is a block diagram of an electronic device configured to link a thumbnail of an image and at least one web page having contents that are similar to contents of the image, according to one embodiment of the present disclosure.

FIG. 3 is a block diagram of the electronic device 120 configured to link a thumbnail of an image and at least one web page having contents that are similar to contents of the image, according to one embodiment of the present disclosure. The electronic device 120 may include an image sensor 310, a storage unit 320, an I/O unit 330, a communication unit 340, and a processor 350. The processor 350 may include a thumbnail generation unit 352, a text region detection unit 354, a text recognition unit 356, a web page search unit 358, a web page selection unit 360, a web page capturing unit 362, and an image linking unit 364. The electronic device 120 may communicate with a plurality of external devices (e.g., a server or the like), which stores one or more images, through the communication unit 340 via a communication network 370.

The image sensor 310 may be configured to capture an image of an object such as a text object or a non-text object. The image sensor 310 can be any suitable device that can be used to capture, sense, and/or detect an image of an object that may include text. Additionally or alternatively, an image of an object including text may be received from an external device via the I/O unit 330 or through the communication unit 340 via the communication network 370.

The storage unit 320 may be configured to store one or more images including text, one or more thumbnails of the images, and metadata of the images and thumbnails. Each of the images and the thumbnails may include one or more text regions, each of which includes text such as at least one character string. As used herein, metadata of an image or a thumbnail of the image may indicate data describing or relating to the image or the thumbnail and include size information, color depth information, resolution information, time information, configuration information, and the like, for the image or the thumbnail. In one embodiment, an image and a thumbnail including text in the storage unit 320 may be accessed by the processor 350 to link the thumbnail of the image to at least one web page associated with the text in the image. In this case, link information (e.g. a URL or the like) for the at least one web page may be stored as metadata of the image or the thumbnail. The metadata may allow the user 110 to access the at least one web page in response to selecting the thumbnail. The storage unit 320 may be remote or local storage, and may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

The storage unit 320 may also store a classifier database that may classify text and/or non-text for identifying one or more text regions in an image of a scene. In one embodiment, the classifier database may include a plurality of probability models for a plurality of languages (e.g., English, French, and the like) that can be used to determine a probability that given text is associated with one of the languages. Additionally, the storage unit 320 may store a character information database that may be used for recognizing at least one character string associated with a plurality of languages. For each of the languages, the character information database may include patterns or geometric data of a plurality of characters used in the language, images of glyphs representing the plurality of characters in the language, and/or at least one feature associated with each individual glyph in the language. To recognize the at least one character string (e.g., a word), the storage unit 320 may also store a dictionary database for a plurality of languages that may include a plurality of words. Further, the storage unit 320 may store a plurality of predetermined types of character strings such as a phone number, a company name, a personal name, an address, an e-mail, etc.

The I/O unit 330 may be configured to receive commands from a user of the electronic device 120 and/or output information for the user. In one embodiment, the I/O unit 330 may receive a command or input from the user 110 to select one of a plurality of thumbnails of images, which may be displayed on the display screen 210 (illustrated in FIG. 2) in the I/O unit 330. For example, the user 110 may touch a portion of a thumbnail including text on the display screen 210, which may be a touch-sensitive screen, to select the thumbnail. Once the thumbnail is selected on the display screen 210, a web page linked with the selected thumbnail may be displayed on the display screen 210. In some embodiments, the I/O unit 330 may receive a command or input from the user to capture an image of a web page, which is currently being displayed on the display screen 210. As illustrated herein, the I/O unit 330 may be any suitable device capable of receiving commands and/or outputting information. In one embodiment, the I/O unit 330 may include an input unit such as a touch screen, a button, a keypad, a touchpad, or the like, and an output unit such as the display screen 210, a speaker, a vibrator, or the like.

The processor 350 may be configured to link an image to at least one web page having contents similar to contents of the image for accessing the at least one web page in response to selecting a thumbnail of the image. To link the image and the at least web page, the storage unit 320 may store the image and/or the thumbnail of the image that maps to link information for the at least one web page. For example, the link information for the at least one web page may be associated with the thumbnail or stored as metadata of the thumbnail. In response to selecting the thumbnail, the at least one web page may be outputted via the I/O unit 330.

The thumbnail generation unit 352 in the processor 350 may be configured to receive one or more images including at least one text region from the storage unit 320 and generate one or more thumbnails of the images. In one embodiment, the thumbnail generation unit 352 may resize an image to generate a thumbnail of the image. For example, the thumbnail of the image may be generated by reducing the size of the image. Alternatively, the thumbnail generation unit 352 may crop a portion of the image to generate the thumbnail of the image. The generated thumbnail of the image may then be stored in the storage unit 320 in association with the image and metadata of the thumbnail and/or the image.

The text region detection unit 354 in the processor 350 may be configured to receive one or more images including at least one text region from the storage unit 320 and detect the at least one text region in each of the images. Given an image with at least one text region, one or more candidate text regions may be detected in the image using any suitable text candidate extraction schemes such as a blob clustering method, an edge based method, a connected-component based method, a texture based method, or the like. In one embodiment, the text region detection unit 354 may identify one or more of the detected candidate text regions as one or more text regions in the image.

In some embodiments, upon detecting the candidate text regions in the image, the text region detection unit 354 may extract a set of features from each of the candidate text regions. The text region detection unit 354 may then generate a classification score for the set of features associated with each of the candidate text regions based on the classifier database from the storage unit 320. Alternatively, the classifier database may be received from an external device through the communication unit 340 via the communication network 370. Based on the classification scores associated with the candidate text regions, the text region detection unit 354 may identify the at least one text region in the image. For example, if a classification score for a candidate text region in an image exceeds a predetermined threshold score, the candidate text region may be identified as a text region in the image. The at least one text region in the image as identified may be provided to the text recognition unit 356 in the processor 350.

Additionally, upon identifying at least one text region in one or more images, the text region detection unit 354 may determine text region information characterizing the at least one text region in the images. In one embodiment, the text region detection unit 354 may generate text region information for the at least one text region by determining character sizes, stroke widths, layouts (e.g., locations), etc. of the at least one text region. The text region information may then be provided to each of the web page search unit 358 and the web page selection unit 360 in the processor 350.

The text recognition unit 356 in the processor 350 may be configured to receive at least one text region including at least one character string from the text region detection unit 354, and perform text recognition on the at least one text region to recognize the at least one character string in the at least one text region. In one embodiment, the text recognition unit 356 may access the character information database in the storage unit 320 for use in recognizing the at least one character string. The at least one character string may be recognized based on the character information database using any suitable character recognition schemes such as matrix matching, feature matching, etc.

In one embodiment, the text recognition unit 356 may recognize the at least one character string in the at least one text region by comparing character information identified from the at least one text region and the character information database. For example, the text recognition unit 356 may identify patterns or symbols in the at least one text region and compare the patterns or symbols with pattern or geometric data for a plurality of characters from the character information database. In this case, if a similarity value between one or more identified patterns or symbols and pattern or geometric data for a specified character is determined to exceed a predetermined threshold value, the patterns or symbols may be recognized as the specified character. The recognized characters may then be identified as at least one character string in the at least one text region.

The text recognition unit 356 may be configured to detect one or more words from the recognized at least one character string in the at least one text region. In some embodiments, the text recognition unit 356 may detect a string of characters as a word in the at least one text region by detecting any suitable characters, symbols, or spaces that may separate or distinguish words in a script. For example, a word in a text region may be detected when a string of characters ends in a space. The words in the at least one text region may be compared with the dictionary database including a plurality of words that may accessed from the storage unit 320. If a detected word in a text region is identical or similar to one of the words in the dictionary database, the word may then be determined as a word in the at least one character string in the at least one text region.

The web page search unit 358 may be configured to receive at least one character string in an image from the text recognition unit 356 and search a plurality of web pages based on the at least one character string. In this process, the web page search unit 358 may generate a search query from the at least one character string and receive the web pages based on the search query. According to one embodiment, the web page search unit 358 may receive text region information for at least one text region in the image from the text region detection unit 354 and generate a search query from the at least one character string based on the text region information such as character sizes, stroke widths, locations, etc. of the at least one text region. For example, the search query may be generated by selecting at least one word from the at least one character string, which may include a plurality of words, based on the text region information.

In some embodiments, in order to generate a search query, the web page search unit 358 may select at least one word from a plurality of words, which may be included in the at least one character string, based on a number of occurrences of each of the words in the image using any suitable statistical modeling method such as word n-gram, word histogram, etc. Additionally or alternatively, the web page search unit 358 may determine whether the plurality of words is indicative of a predetermined type of character strings such as a phone number, a company name, a personal name, an address, an e-mail, etc. If one or more words correspond to the predetermined type of character strings, such words may be selected and used as the search query. Using the search query, the web page search unit 358 may access and receive the web pages associated with the image that may be searched by any suitable search engines provided internally or externally via the communication network 370 and/or may be stored in the storage unit 320.

The web page selection unit 360 may be configured to receive the web pages associated with the at least one character string in the image and select at least one web page from the web pages. In one embodiment, the web page selection unit 360 may determine whether contents of the image are similar to contents of the web pages to select the at least one web page from the web pages. For example, the web page selection unit 360 may extract a first feature indicative of the at least one text region in the image and a plurality of second features indicative of text in the web pages. The web page selection unit 360 may compare the first feature with each of the second features to determine similarity between the image and the associated web page. Based on the similarities, at least one of the web pages may be selected to be linked to a thumbnail of the image.

According to one embodiment, the web page selection unit 360 may determine at least one similarity between the image and the web pages based on the at least one character string in the contents of the image and one or more words in the contents of the web pages. In this process, the web page selection unit 360 may parse the words in each of the web pages and one or more words included in the at least one character string in the image. The words in the images and the web pages may be used to determine the at least one similarity based on a natural language processing (e.g., a syntactic analysis, a lexical analysis, and/or a semantic analysis), as described in detail with reference to reference numerals 720, 730, and 740 in FIG. 7. Additionally or alternatively, the web page selection unit 360 may determine the at least one similarity based on text region information for the at least one text region in the image and text region information (e.g., layouts, stroke widths, character sizes, etc.) for the web pages. In this case, the web page selection unit 360 may receive the text region information for the at least one text region from the text region detection unit 354 and determine text region information for text in each of the web pages to compare the text region information associated with each of the web pages to the text region information associated with the image.

In some embodiments, the web page selection unit 360 may assign at least one rank to the web pages based on the at least one similarity between the contents of the image and the contents of the web pages. The at least one web page may then be selected based on the at least one rank. For example, the web pages may be ranked in order of the at least one similarity associated with the web pages. The web page selection unit 360 may provide link information (e.g., at least one URL) associated with the at least one web page selected for the image to the image linking unit 364 in the processor 350. In addition, the web page selection unit 360 may retrieve a thumbnail of the image from the storage unit 320 and provide it to the image linking unit 364.

The web page capturing unit 362 may be configured to capture an image of a web page that is displayed on the display screen 210 of the I/O unit 330 and obtain link information (e.g., a URL) associated with the web page. In one embodiment, a user of the electronic device 120 may access and display one or more web pages through any suitable search engine and provide a command via the I/O unit 330 to capture a web page, which is currently being displayed on the display screen 210, as an image. Upon receiving the command to capture the image, the web page capturing unit 362 may obtain link information for the web page based on the displayed web page. In this case, the link information may include an address (e.g., a URL address) indicative of the web page. In addition, the captured image may be provided to the thumbnail generation unit 352 for generating a thumbnail of the image. Then, the image and/or the thumbnail as well as the link information for the web page may then be provided to the image linking unit 364.

The image linking unit 364 may be configured to receive a thumbnail of an image and link information for at least one web page linked with the image from the web page selection unit 360 for linking the thumbnail to the at least one web page. Alternatively, if the image and the at least one web page are received from the web page selection unit 360, the image linking unit 364 may retrieve the thumbnail of the image from the storage unit 320. The link information for the at least one web page may be stored as metadata of the thumbnail for use in accessing the at least one web page in response to selecting the thumbnail. If link information for a plurality of web pages is received for an image, the image linking unit 364 may generate a list of the web pages including the link information (e.g., a URL address for each of the web pages). In this case, the list of the web pages may be displayed in response to selecting the thumbnail. When the list of the web pages is displayed on the display screen 210, the user may select one of the web pages from the list to access the selected web page.

In some embodiments, the image linking unit 364 may link at least one web page associated with an image to a portion of the image. For example, the portion of the image may include at least one character string associated with a search query that is generated for searching a list of web pages for the image. Additionally or alternatively, the image linking unit 364 may link a portion of a web page that may be searched and selected for an image to a thumbnail of the image. In this case, the portion of the web page may include contents that are similar to contents in the image.

According to another embodiment, the image linking unit 364 may receive a captured image of a web page and/or a thumbnail of the image and link information (e.g., a URL) for the web page from the web page capturing unit 362. The link information for the web page may be tagged to the thumbnail of the image as metadata and the tagged image may be stored in the storage unit 320. In this case, the web page may be accessed in response to selecting the thumbnail tagged with the link information for the web page.

Figure 4:
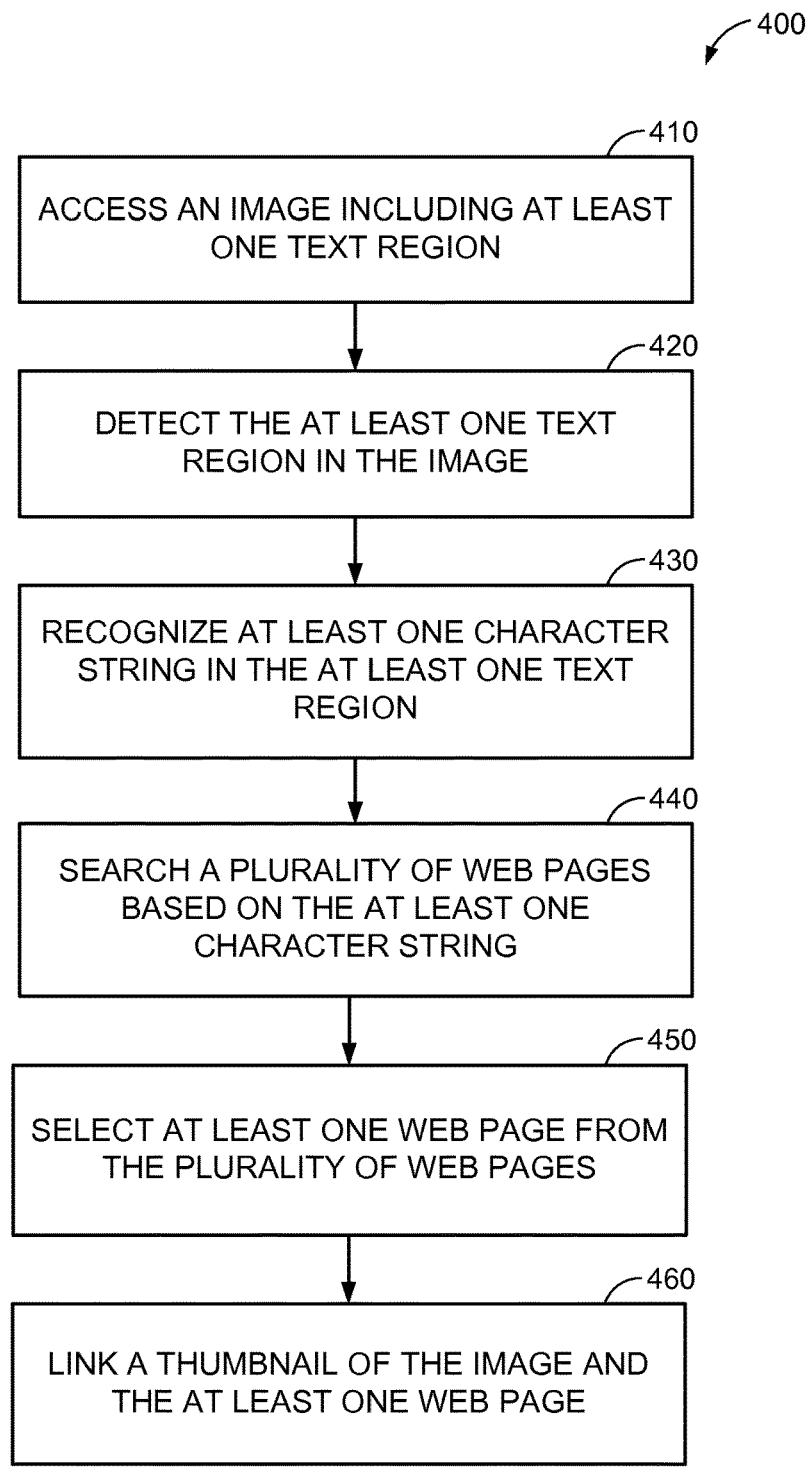
FIG. 4 illustrates is a flowchart of a method, performed by an electronic device, for linking a thumbnail of an image having contents and at least one web page having contents similar to the contents of the image, according to one embodiment of the present disclosure.

FIG. 4 illustrates is a flowchart of a method 400, performed by the electronic device 120, for linking a thumbnail of an image having contents and at least one web page having contents similar to the contents of the image, according to one embodiment of the present disclosure. Initially, the processor 350 in the electronic device 120 may access the image including at least one text region, which includes at least one character string, from the storage unit 320 or an external storage device, at 410. At 420, the text region detection unit 354 in the processor 350 may detect the at least one text region in the image using any suitable text extraction schemes such as a blob clustering method, an edge based method, a connected-component based method, a texture based method, or the like.

At 430, the text recognition unit 356 in the processor 350 may recognize the at least one character string in the at least one text region using any suitable character recognition schemes such as matrix matching, feature matching, etc. The web page search unit 358 in the processor 350 may receive the at least one character string from the text recognition unit 356 and search a plurality of web pages based on the at least one character string, at 440. In one embodiment, the plurality of web pages may be searched based on a search query, which may be generated from the at least one character string.

The web page search unit 358 may provide the plurality of web pages to the web page selection unit 360. In response, the web page selection unit 360 may select at least one web page from the plurality of web pages, at 450. In one embodiment, the web page selection unit 360 may determine whether contents of the image are similar to contents of the web pages to select the at least one web page from the web pages. The image linking unit 364 in the processor 350 may link the thumbnail of the image and the selected at least one web page, at 460. For example, link information for the at least one web page may be stored as metadata of the thumbnail of the image for use in accessing the at least one web page in response to selection of the thumbnail.

Figure 5:
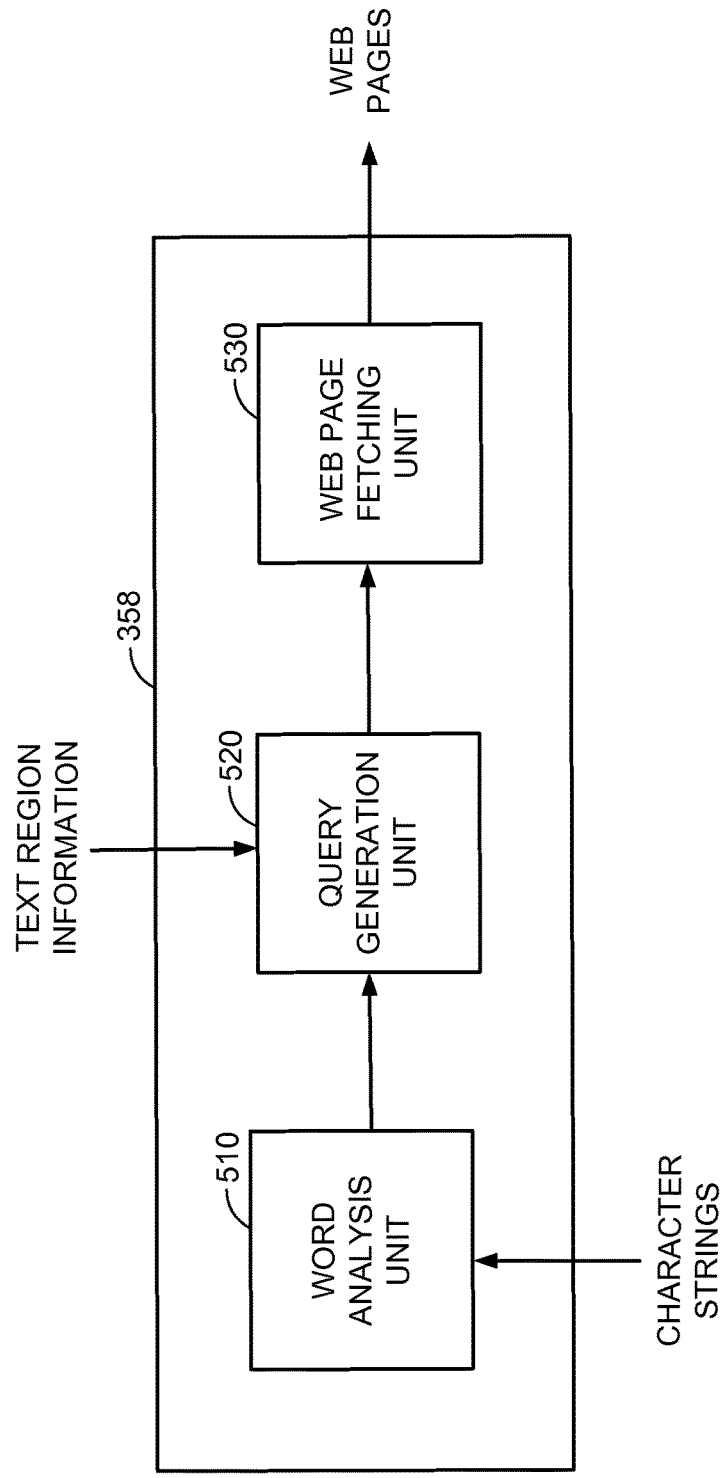
FIG. 5 describes a block diagram of a web page search unit configured to receive one or more character strings in at least one text region of an image from a text recognition unit and search a plurality of web pages based on the character strings, according to one embodiment of the present disclosure.

FIG. 5 illustrates a block diagram of the web page search unit 358 configured to receive one or more character strings in at least one text region of an image from the text recognition unit 356 and search a plurality of web pages based on the character strings, according to one embodiment of the present disclosure. Each of the web pages may refer to any web document associated with a URL address accessible via the Internet or internet and may include text, an image, a map, a video, an audio, or a combination thereof. In the illustrated embodiment, the web page search unit 358 may include a word analysis unit 510, a query generation unit 520, and a web page fetching unit 530.

In the web page search unit 358, the word analysis unit 510 may parse a plurality of words, which may be included in the at least one character string. According to one embodiment, the word analysis unit 510 may count a number of occurrences of each of the words. For example, the number of occurrences of each word may be calculated by using any suitable statistical modeling method such as word n-gram, word histogram, etc. In this process, the word analysis unit 510 may determine whether two or more words in the image are similar or equivalent words (e.g., a synonym, similar words, etc.), which may be counted as a single word for determining a number of occurrences. Additionally or alternatively, the word analysis unit 510 may determine one or more types (e.g., a phone number, a company name, a personal name, an address, an e-mail, etc.) of the words in the image. The numbers of occurrences and/or the types of the words in the image may then be provided to the query generation unit 520 in the web page search unit 358.

Upon receiving the numbers of occurrences and/or types of the words in the image, the query generation unit 520 may generate one or more search queries by selecting at least one word from the words. In one embodiment, the query generation unit 520 may select, among the plurality of words, at least one word that appears more than a predetermined number of occurrences. According to another embodiment, words with a predetermined number of highest occurrences may be selected and used as one or more search queries. In some cases, if the type each word in the image is determined to correspond to a predetermined types such as a phone number, a company name, a personal name, an address, an e-mail address, or the like, such words may be selected and included in one or more search queries.

According to some embodiments, the query generation unit 520 may also receive text region information for at least one text region (e.g., character sizes, stroke widths, locations, or the like in the at least one text region) in the image from the text region detection unit 354 and select the at least one word from the words in the image as one or more search queries based on the text region information. For example, if a character size of each of one or more words in a text region is greater than a predetermined size, the words may be selected for generating one or more search queries. The search queries generated for the image may be provided to the web page fetching unit 530 in the web page search unit 358.

Upon receiving the search queries for the image from the query generation unit 520, the web page fetching unit 530 may search a plurality of web pages associated with the search queries. For each of the search queries, the web page fetching unit 530 may search one or more web pages using any suitable engines, which may be provided internally or externally via the communication network 370. Additionally or alternatively, a plurality of web pages may be stored in the storage unit 320, which may be accessed and searched by the web page fetching unit 530. Although the web page search unit 358 is illustrated as searching a plurality of web pages based on one or more search queries, the web page search unit 358 may search only one web page based on one or more search queries.

Figure 6:
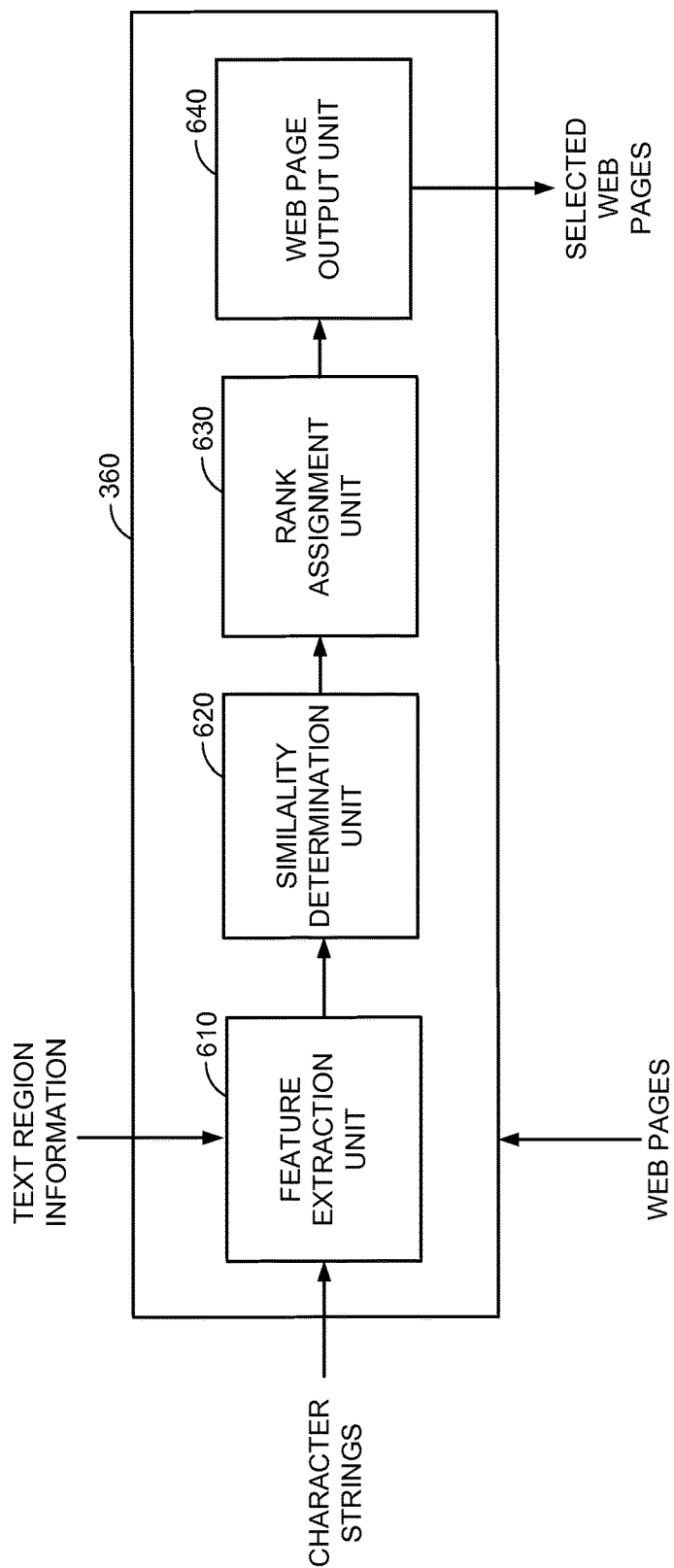
FIG. 6 is a block diagram of a web page selection unit configured to receive contents in an image associated with a thumbnail and contents of a plurality of web pages and select one or more web pages from the plurality of web pages, according to one embodiment of the present disclosure.

FIG. 6 illustrates a block diagram of the web page selection unit 360 configured to receive contents in an image associated with a thumbnail and contents of a plurality of web pages and select one or more web pages from the plurality of web pages, according to one embodiment of the present disclosure. The contents of the image may include text region information for at least one text region in the image that may be received from the text region detection unit 354 and one or more character strings in the at least one text region that may be received from the text recognition unit 356. In the illustrated embodiment, the web page selection unit 360 may include a feature extraction unit 610, similarity determination unit 620, a rank assignment unit 630, and a web page output unit 640. The web page selection unit 360 may receive the plurality of web pages from the web page search unit 358 and select one or more web pages that may be linked to the thumbnail of the image. The selected web pages may then be provided to the image linking unit 364 for linking the thumbnail of the image and the selected web pages.

The feature extraction unit 610 may be configured to receive text region information for at least one text region in the image from the text region detection unit 354 and one or more character strings in the at least one text region from the text recognition unit 356. Additionally, the feature extraction unit 610 may receive the plurality of web pages that have been searched from the web page search unit 358. Based on at least one of the text region information or the character strings, the feature extraction unit 610 may extract a first feature indicative of the at least one text region in the image. In addition, a second feature indicative of text in each of the received web pages may be extracted. The first feature associated with the image and the second features associated with the received web pages may be provided to the similarity determination unit 620. In one embodiment, the first feature and the second features may be generated based on text region information and/or character strings in the image and the web pages, respectively. For example, a first feature may be represented as a feature vector including a plurality of values indicative of text region information and/or character strings of an image. Similarly, a second feature may be represented as a feature vector including a plurality of values indicative of text region information and/or character strings of a web page.

Upon receiving the first feature associated with the image and the second features associated with the web pages, the similarity determination unit 620 may determine similarity between the first feature and each of the second features. In one embodiment, the similarity determination unit 620 may determine similarity between the first feature and each of the second features by determining a distance (e.g., a Euclidean distance) between the first feature and the second feature. The similarities of the second features of the web pages to the first feature of the image may then be provided to the rank assignment unit 630.

The rank assignment unit 630 may receive the web pages and the associated similarities to the first feature of the image from the similarity determination unit 620. In one embodiment, a rank may be assigned to each of the web pages according to the similarity associated with the web page. For example, the rank assignment unit 630 may access a specified number of web pages for the image and assign a rank to each of the web pages based on similarity between the image and each of the web pages. In this case, a number of highest ranking web pages (e.g., first to fifth highest ranking web pages) may be selected and provided to the web page output unit 640 in the web page selection unit 360, together with the associated ranks. Although the rank assignment unit 630 is described as accessing a specified number of web pages and selecting a number of highest ranking web pages, it may access any suitable number of web pages and select any suitable number of highest ranking web pages.

The web page output unit 640 may receive the web pages that have been selected based on their ranks as well as the associated ranks from the rank assignment unit 630. In one embodiment, the web page output unit 640 may select a specified number of the highest ranking web pages among the received web pages. Alternatively, the web page output unit 640 may receive similarities between web pages that have been searched for the image and the image from the similarity determination unit 620 and select one or more web pages having similarities that exceed threshold similarity, which may be predetermined. The selected web pages may then be provided to the image linking unit 364 in the processor 350. In some embodiments, the web page output unit 640 may also provide the ranks associated with the selected web pages to the image linking unit 364.

Figure 7:
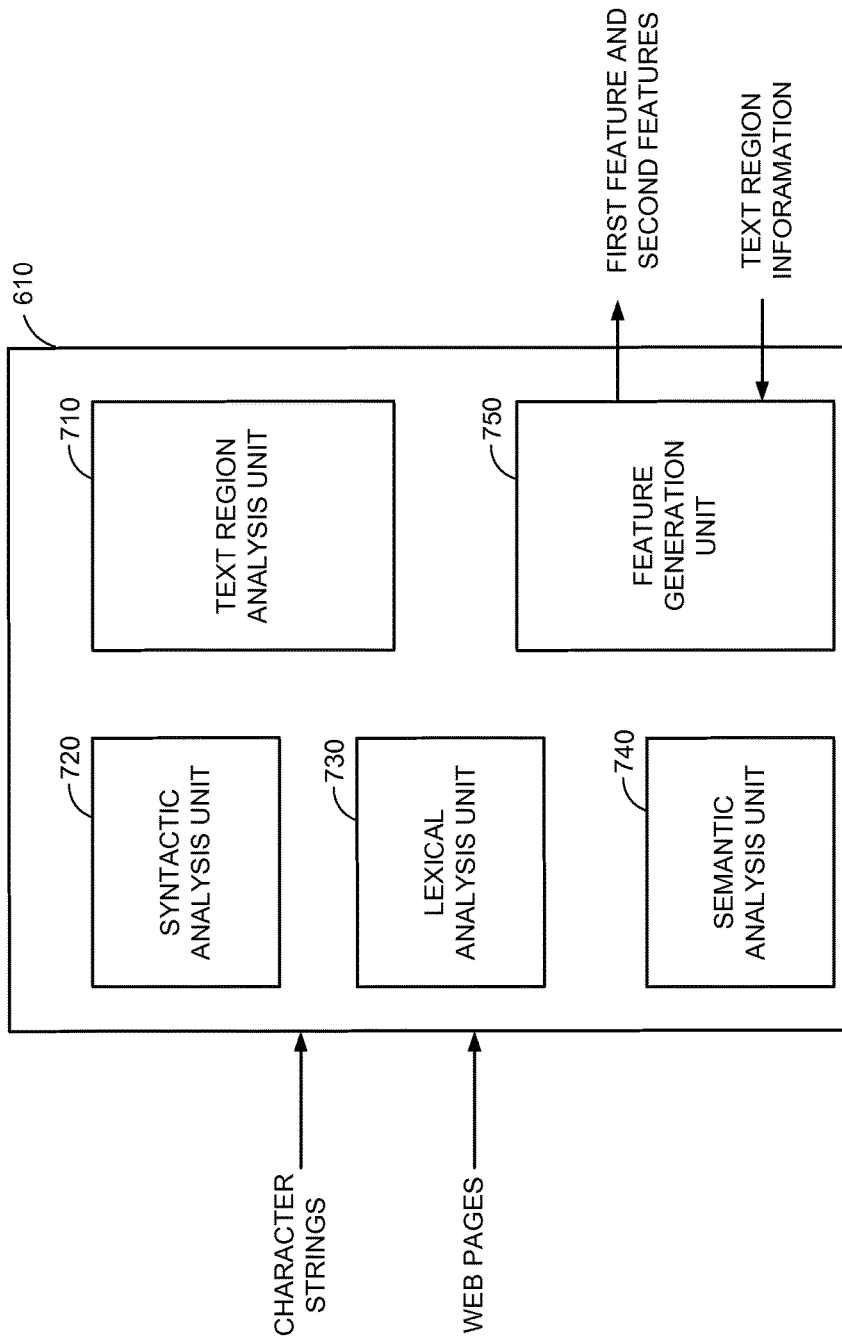
FIG. 7 illustrates a block diagram of a feature extraction unit configured to extract a first feature from an image and a plurality of second features from a plurality of web pages that have been searched, according to some embodiments of the present disclosure.

FIG. 7 illustrates a block diagram of the feature extraction unit 610 configured to extract a first feature from an image and a plurality of second features from a plurality of web pages that have been searched, according to one embodiment of the present disclosure. The feature extraction unit 610 may receive one or more character strings in at least one text region in the image from the text recognition unit 356 and the plurality of web pages from the web page search unit 358. In addition, the text region information for the image may be received from the text region detection unit 354. The feature extraction unit 610 may include a syntactic analysis unit 720, a lexical analysis unit 730, a semantic analysis unit 740, a text region analysis unit 710, and a feature generation unit 750.

The text region analysis unit 710 may be configured to detect one or more text regions from the web pages received from the web page search unit 358 and recognize one or more character strings in the text regions. In addition, the text region analysis unit 710 may determine text region information from the detected text regions in the web pages. For example, the text region information may include character sizes, stroke widths, layouts (e.g., locations), etc. of the detected text regions in the web pages. The character strings in the text regions of the web pages may be provided to the syntactic analysis unit 720, the lexical analysis unit 730, and the semantic analysis unit 740. Further, the text region information for the text regions of the web pages may be provided to the feature generation unit 750 for use in generating the second features for the web pages.

The syntactic analysis unit 720 may be configured to receive and parse the character strings of the web pages and the character strings of the image. In one embodiment, the syntactic analysis unit 720 may recognize a plurality of words in the character strings of the image and a plurality of words in the character strings of the web pages. Alternatively, the plurality of words in the character strings of the image may be received from the text recognition unit 356. Based on the recognized words in the image, the syntactic analysis unit 720 may determine a total length of the recognized words (such as a total number of characters, phonemes, or syllables) in the image. In addition, a total length of the recognized words (e.g., a total number of characters, phonemes, or syllables) in each of the web pages may be determined. Additionally or alternatively, the syntactic analysis unit 720 may determine whether one or more particular words in the image are included in the words of each of the web pages. The parsing results including the total length of words, whether the particular words are included in each of the web pages, or the like may be provided to the feature generation unit 750.

The lexical analysis unit 730 may be configured to receive the character strings of the image and the character strings of the web pages and determine a plurality of sequences of tokens (e.g., meaningful sets of characters) from the character strings of the image and the web pages. In one embodiment, the lexical analysis unit 730 may determine whether one or more lexical groups extracted from the tokens of the image correspond to one or more lexical groups extracted from the tokens of each of the web pages. For example, the lexical groups may be indicative of a particular sentence structure (e.g., an arrangement of words to form a meaningful sentence), a set of particular words, etc. The lexical analysis results including whether the lexical groups of the tokens in the image correspond to the lexical groups of the tokens in each of the web pages, or the like may be provided to the feature generation unit 750.

The semantic analysis unit 740 may be configured to receive the character strings of the image and the character strings of the web pages, and perform a semantic analysis on the character strings of the image and the character strings of each of the web pages. In this process, the semantic analysis unit 740 may recognize a plurality of words in the character strings of the image and a plurality of words in the character strings of each of the web pages. Upon recognizing the words, the semantic analysis unit 740 may determine a number of occurrences of each of the words in the image and a number of occurrences of each of the words in each of the web pages by using any suitable statistical modeling method such as a word n-gram, a word histogram, a word occurrence matrix, etc. Additionally or alternatively, the semantic analysis unit 740 may determine whether the recognized words in the image and the web pages are indicative of a predetermined type of character strings such as a phone number, a company name, a personal name, an address, an e-mail, or the like. The semantic analysis results including the number of occurrences of each of the words in the image and the web pages, whether the words in the image and the web pages are indicative of a predetermined type of character strings, or the like may be provided to the feature generation unit 750.

The feature generation unit 750 may be configured to receive the parsing results, the lexical analysis results, and the semantic analysis results from the syntactic analysis unit 720, the lexical analysis unit 730, and the semantic analysis unit 740, respectively. Additionally, the feature generation unit 750 may also receive the text region information for the image from the text region detection unit 354 and the text region information for the web pages from the text region analysis unit 710. In one embodiment, the first feature may be generated from the image based on at least one among the parsing results, the lexical analysis results, the semantic analysis results, and the text region information for the image. Similarly, the second features may be generated from the web pages based on at least one among the parsing results, the lexical analysis results, the semantic analysis results, and the text region information for the web pages. In this process, the first feature and the second features may be generated based on one or more corresponding analysis results and/or text region information in the image and the web pages. The feature extraction unit 610 may provide the first feature and the second features to the similarity determination unit 620 for determining similarity between the first feature and each of the second features. Although the feature extraction unit 610 includes the syntactic analysis unit 720, the lexical analysis unit 730, the semantic analysis unit 740, and the text region analysis unit 710, it may utilize any one or combination of such analysis units or any other suitable analysis methods.

Figure 8:
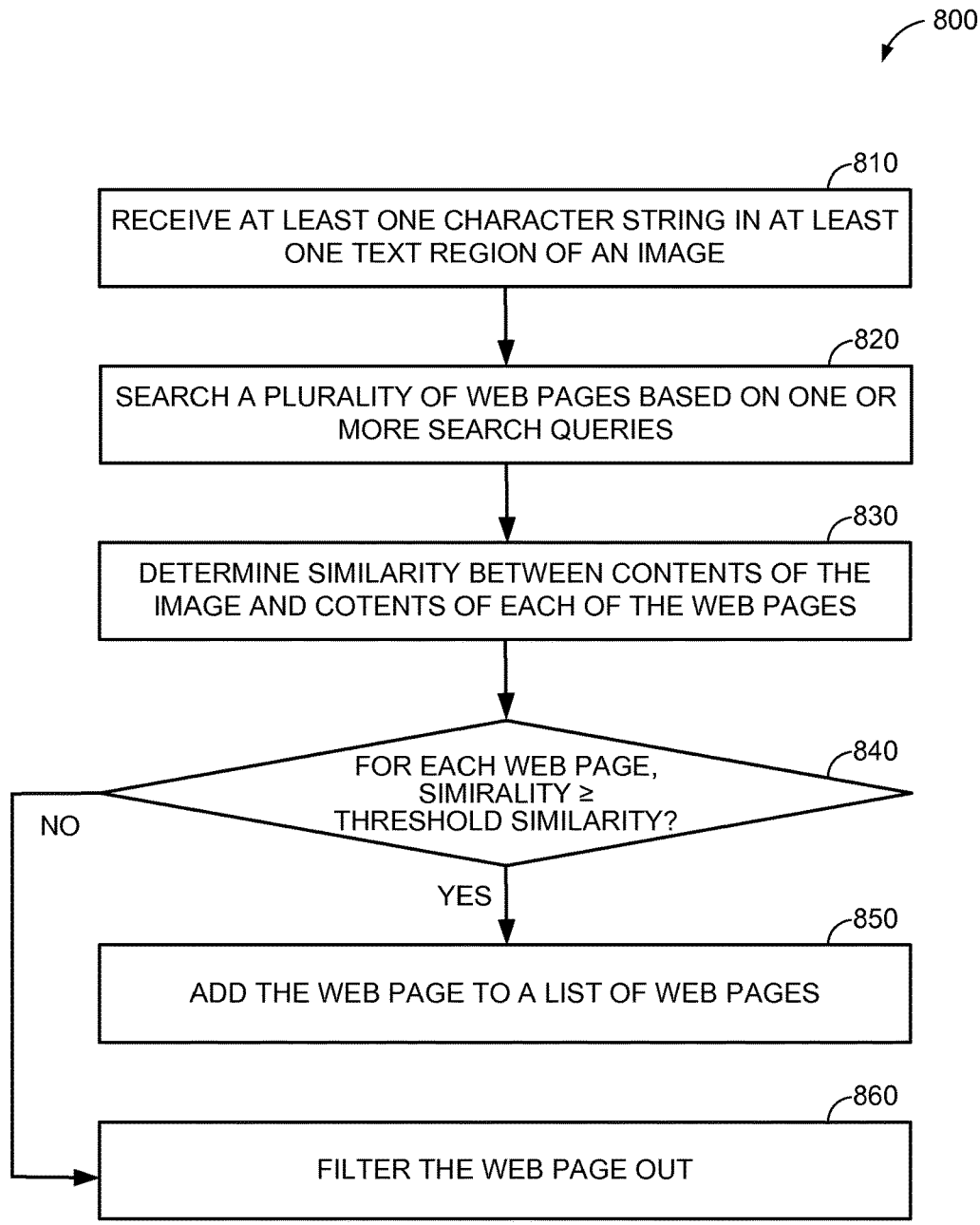
FIG. 8 is a flowchart of a method, performed by an electronic device, for searching a plurality of web pages based on at least one character string in at least one text region of an image and selecting at least one web page from the plurality of web pages, according to one embodiment of the present disclosure

FIG. 8 illustrates a flowchart of a method 800, performed by the electronic device 120, for searching a plurality of web pages based on at least one character string in at least one text region of an image and selecting at least one web page from the plurality of web pages, according to one embodiment of the present disclosure. Initially, the web page search unit 358 may receive the at least one character string of the image from the text recognition unit 356, at 810. At 820, a plurality of web pages may be searched based on one or more search queries, which may be generated from the at least one character string of the image.

At 830, the web page selection unit 360 may determine similarity between contents of the image and contents of each of the searched web pages. In this case, the contents of the image may include text region information for the at least one text region in the image that may be received from the text region detection unit 354 and the at least one character string in the at least one text region that may be received from the text recognition unit 356. In addition, the web page selection unit 360 may determine one or more character strings in one or more text regions of each of the web pages and text region information for the text regions of the associated web page. The character strings of each of the web pages and the text region information for the associated web page may be included in contents of the web page.

At 840, the method 800 may determine whether the similarity between the image and each of the web pages is greater than or equal to threshold similarity, which may be predetermined. For each web page, if it is determined that the similarity between the image and the web page is greater than or equal to the threshold similarity (i.e., "YES" at 850), the method may proceed to 850 to generate a list of web pages that includes the web page. Otherwise (i.e., "NO" at 840), the web page selection unit 360 may filter the web page out, at 860.

Figure 9:
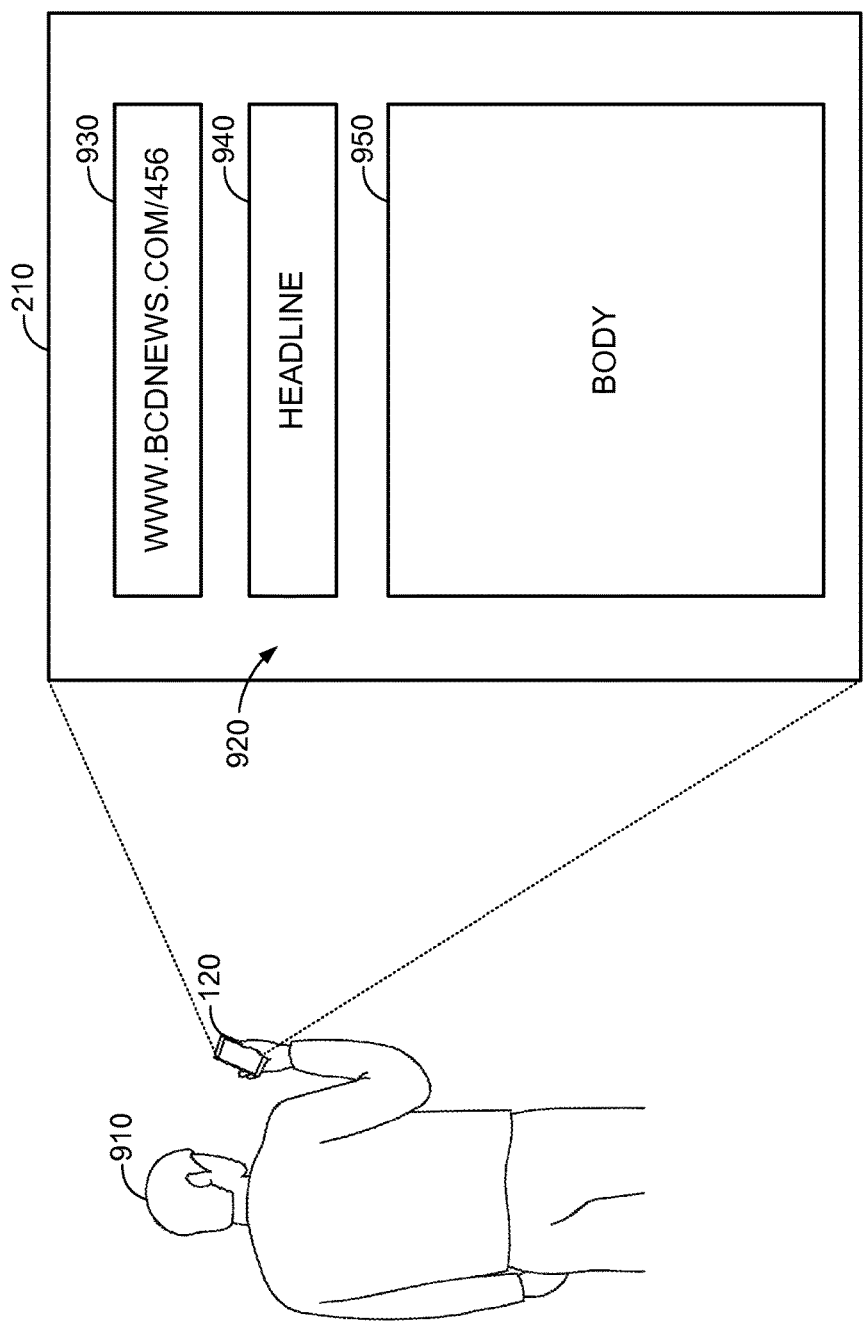
FIG. 9 depicts an electronic device configured to access a web page and capture an image of the web page for linking a thumbnail of the image to the web page, according to one embodiment of the present disclosure.

FIG. 9 illustrates the electronic device 120 configured to access a web page and capture an image of the web page for linking a thumbnail of the image to the web page, according to one embodiment of the present disclosure. A user 910 may operate the electronic device 120 to access one or more web pages using any suitable search engine via the communication network 370. As shown, a web page 920 including text may be accessed via the communication network 370 and displayed on the display screen 210. For example, the web page 920 may include an article having a plurality of text regions 930, 940, and 950, which may include character strings "WWW.BCDNEWS.COM/456" indicative of an address (e.g., a URL address, etc.) of the web page 920, a character string "HEADLINE" (e.g., a title, a headline, etc.), and a character string "BODY" (e.g., a body, a content, etc.), respectively.

In one embodiment, the user 910 may operate the electronic device 120 to capture and store an image of the web page 920 in the electronic device 120. For example, the captured image may include at least one among the text regions 930, 940, and 950. In this case, the web page capturing unit 362 may obtain the URL address "WWW.BCDNEWS.COM/456" from metadata (e.g., HTML tag, etc.) of the web page 920. Alternatively, the text region 930 including the URL address may be detected by the text region detection unit 354 and the URL address in the text region 930 may be recognized by text recognition unit 356. Additionally, the thumbnail generation unit 352 in the electronic device 120 may generate a thumbnail of the image of the web page 920.

The electronic device 120 may be configured to link the thumbnail of the captured image of the web page to the web page. In one embodiment, a URL address of the web page may be tagged to the thumbnail of the image and be stored as metadata of the thumbnail. In the illustrated embodiment, the URL address "www.BCDnews.com/456" of the web page 920 may be stored as metadata of the thumbnail of the image of the web page 920. Upon storing the metadata of the thumbnail of the web page image, the electronic device 120 may display the web page 920 on the display screen 210 in response to receiving an input to select the thumbnail of the image.

Figure 10:
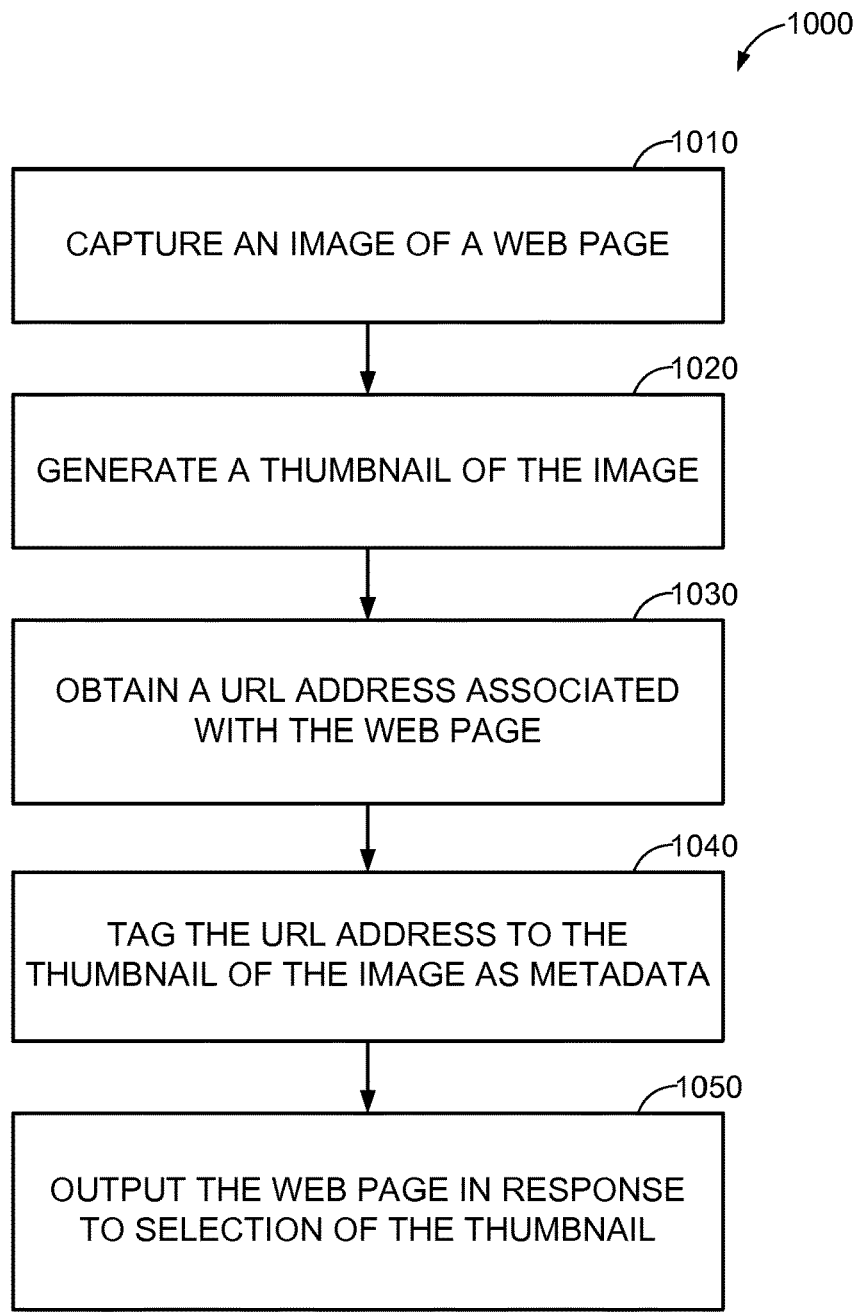
FIG. 10 is a flowchart of a method, performed by an electronic device, for capturing an image of a web page and linking a thumbnail of the image to the web page, according to one embodiment of the present disclosure.

FIG. 10 is a flowchart of a method 1000, performed by the electronic device 120, for capturing an image of a web page and linking a thumbnail of the image to the web page, according to one embodiment of the present disclosure. Initially, the web page capturing unit 362 in the processor 350 may capture the image of the web page, which may be displayed on the display screen 210, at 1010. At 1020, the thumbnail generation unit 352 in the processor 350 may generate and store the thumbnail of the web page image in the storage unit 320.

At 1030, the web page capturing unit 362 may obtain an address such as a URL address, etc. associated with the web page from metadata (e.g., HTML tag, etc.) of the web page. The address associated with the web page may be tagged to the generated thumbnail of the web page image, at 1040. In this case, the address associated with the web page may be stored as metadata of the thumbnail. Alternatively, the image linking unit 364 in the processor 350 may store the address associated with the web page as metadata of the image of the web page, rather than generating the thumbnail of the web page image at 1020. After storing the image of the web page, the thumbnail of the webpage image, and metadata of the thumbnail including the URL address of the web page, the electronic device 120 may receive an input to access and select thumbnail of the web page image such that the web page may be output to the electronic device 120, at 1050. Although the method 1000 is illustrated as generating the thumbnail of the image at 1020 before obtaining the URL address associated with the web page at 1030, the thumbnail of the image may be generated while or after obtaining the URL address associated with the web page.

Figure 11:
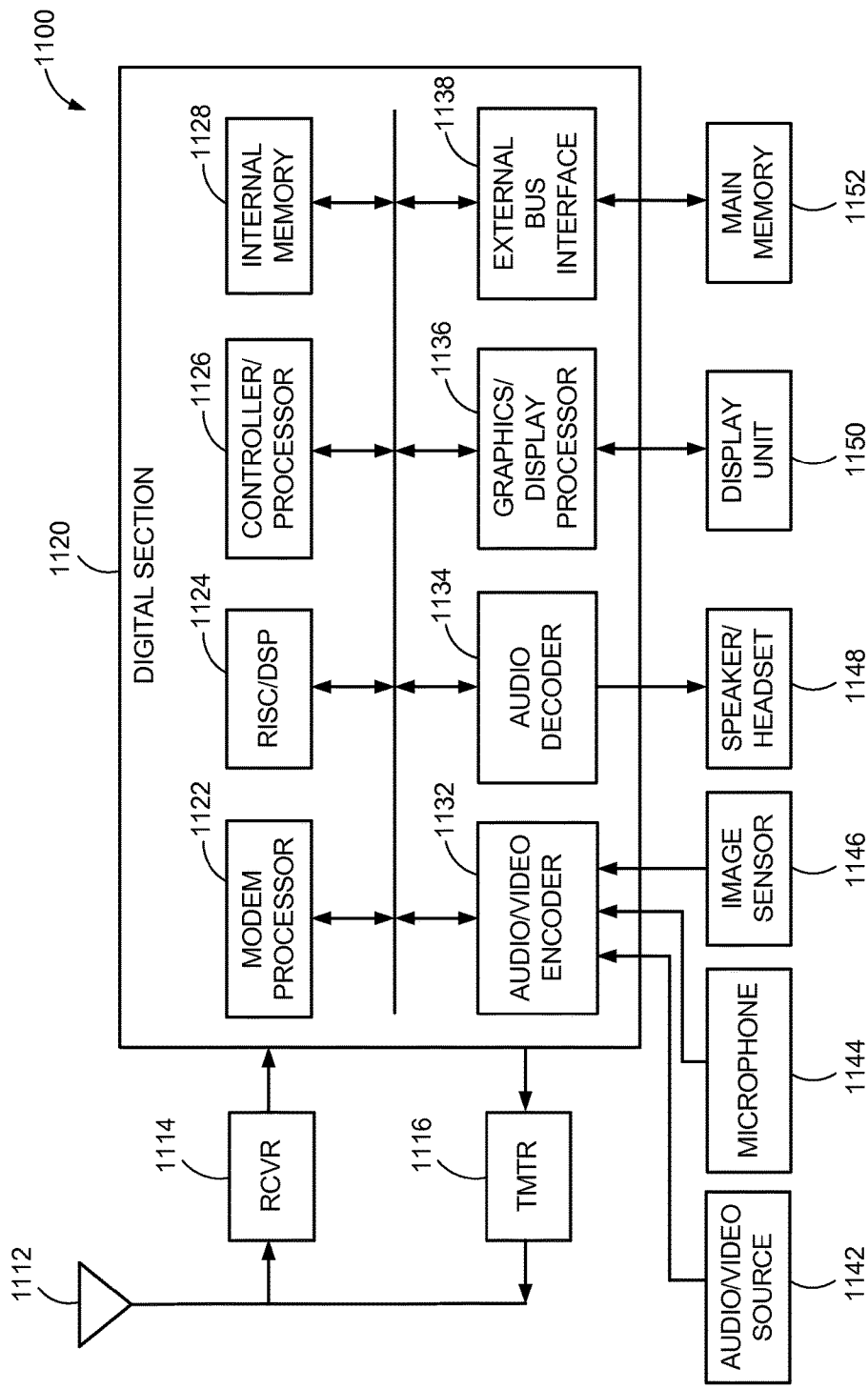
FIG. 11 illustrates a block diagram of a mobile device in a wireless communication system in which the methods and apparatus of the present disclosure for linking a thumbnail of an image and at least one web page that has been searched and selected for the image may be implemented according to some embodiments.

FIG. 11 illustrates a block diagram of a mobile device 1100 in a wireless communication system in which the methods and apparatus of the present disclosure for linking a thumbnail of an image and at least one web page that has been searched and selected for the image may be implemented according to some embodiments. The mobile device 1100 may be a cellular phone, a smartphone, a wearable computer, a smart watch, smart glasses, a tablet personal computer, a terminal, a handset, a personal digital assistant (PDA), a wireless modem, a cordless phone, a tablet, and so on. The wireless communication system may be a CDMA system, a GSM system, a W-CDMA system, a LTE system, a LTE Advanced system, and so on.

The mobile device 1100 may be capable of providing bidirectional communication via a receive path and a transmit path. On the receive path, signals transmitted by base stations may be received by an antenna 1112 and may be provided to a receiver (RCVR) 1114. The receiver 1114 may condition and digitize the received signal, and provide the conditioned and digitized digital signal to a digital section for further processing. On the transmit path, a transmitter (TMTR) 1116 may receive data to be transmitted from a digital section 1120, process and condition the data, and generate a modulated signal, which is transmitted via the antenna 1112 to the base stations. The receiver 1114 and the transmitter 1116 may be part of a transceiver that may support CDMA, GSM, W-CDMA, LTE, LTE Advanced, and so on.

The digital section 1120 may include various processing, interface, and memory units such as, for example, a modem processor 1122, a reduced instruction set computer/digital signal processor (RISC/DSP) 1124, a controller/processor 1126, an internal memory 1128, a generalized audio/video encoder 1132, a generalized audio decoder 1134, a graphics/display processor 1136, and an external bus interface (EBI) 1138. The modem processor 1122 may perform processing for data transmission and reception, e.g., encoding, modulation, demodulation, and decoding. The RISC/DSP 1124 may perform general and specialized processing for the mobile device 1100. The controller/processor 1126 may perform the operation of various processing and interface units within the digital section 1120. The internal memory 1128 may store data and/or instructions for various units within the digital section 1120.

The generalized audio/video encoder 1132 may perform encoding for input signals from an audio/video source 1142, a microphone 1144, an image sensor 1146, etc. The generalized audio decoder 1134 may perform decoding for coded audio data and may provide output signals to a speaker/headset 1148. The graphics/display processor 1136 may perform processing for graphics, videos, images, and texts, which may be presented to a display unit 1150. The EBI 1138 may facilitate transfer of data between the digital section 1120 and a main memory 1152.

The digital section 1120 may be implemented with one or more processors, DSPs, microprocessors, RISCs, etc. The digital section 1120 may also be fabricated on one or more application specific integrated circuits (ASICs) and/or some other type of integrated circuits (ICs).

Figure 12:
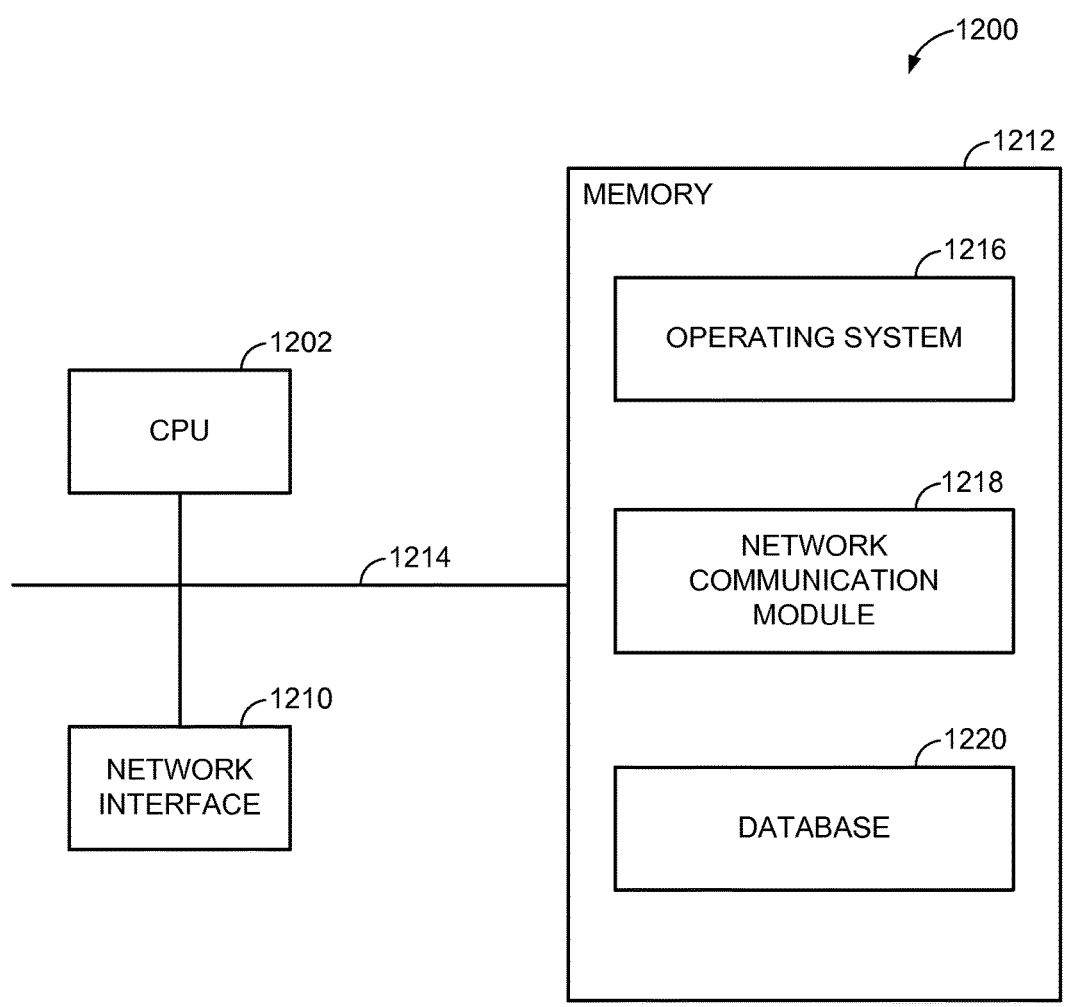
FIG. 12 is a block diagram illustrating a server system, which may be any one of the servers previously described, for searching and providing a plurality of images including one or more objects, a classifier database, a character information database, dictionary database, etc. implemented according to some embodiments

FIG. 12 is a block diagram illustrating a server system 1200, which may be any one of the servers previously described, for searching and providing a plurality of images including one or more objects, a classifier database, a character information database, dictionary database, etc. implemented according to some embodiments. The server system 1200 may include one or more processing units (e.g., CPUs) 1202, one or more network or other communications network interfaces, a memory 1212, and one or more communication buses 1214 for interconnecting these components. The server system 1200 may also include a user interface (not shown) having a display device and a keyboard.

The memory 1212 may be any suitable memory, such as a high-speed random access memory, (e.g., DRAM, SRAM, DDR RAM or other random access solid state memory devices). The memory 1212 may include or may alternatively be non-volatile memory (e.g., one or more magnetic disk storage devices, optical disk storage devices, flash memory devices, or other non-volatile solid state storage devices). In some embodiments, the memory 1212 may include one or more storage devices remotely located from the CPU(s) 1202 and/or remotely located in multiple sites.

Any one of the above memory devices represented by the memory 1212 may store any number of modules or programs that corresponds to a set of instructions for performing and/or executing any of the processes, operations, and methods previously described. For example, the memory 1212 may include an operating system 1216 configured to store instructions that includes procedures for handling various basic system services and for performing hardware dependent tasks. A network communication module 1218 of the memory 1212 may be used for connecting the server system 1200 to other computers via the one or more communication network interfaces 1210 (wired or wireless) and one or more communication networks, such as the Internet, other wide area networks, local area networks, metropolitan area networks, and so on.

The memory 1212 may also include a database 1220 configured to include an image database a plurality of images having one or more objects (e.g., a text object and a non-text object), a classifier database, a character information database, dictionary database, etc. The operating system 1216 may update the image database with various images, which may be received and/or captured, through the network communication module 1218. The operating system 1216 may also provide the images to a plurality of electronic devices via the network communication module 1218. In addition, the classifier database, the character information database, the dictionary database may be provided to a plurality of electronic device for use in detecting at least one text region of an image and/or recognize one or more character strings in the at least one text region.

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored at a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. For example, a computer-readable storage medium may be a non-transitory computer-readable storage device that includes instructions that are executable by a processor. Thus, a computer-readable storage medium may not be a signal.

The previous description of the disclosure is provided to enable a person skilled in the art to make or use the disclosure. Various modifications to the disclosure will be readily apparent to those skilled in the art, and the generic principles defined herein are applied to other variations without departing from the scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1212 may store additional modules and data structures not described above.

Aspects of the Present Disclosure

Hereinafter, some aspects of the present disclosure will be additionally stated.

Example 1

According to an aspect of the present disclosure, there is provided a method for linking a thumbnail of an image and at least one web page, including accessing the image in a storage unit, wherein the image includes at least one text region; detecting the at least one text region in the image; recognizing at least one character string in the at least one text region; searching a plurality of web pages based on the at least one character string; selecting the at least one web page from the plurality of web pages; and linking the thumbnail of the image and the at least one web page.

Example 2

The method of Example 1 further includes receiving an input indicative of selection of the thumbnail; accessing the at least one web page linked with the thumbnail; and outputting the at least one web page on the electronic device.

Example 3

In the method of Example 1 or 2, accessing the at least one web page includes accessing the at least one web page that is stored in the electronic device or searched via a network.

Example 4

In the method of any one of Examples 1 to 3, searching the plurality of web pages includes generating a search query from the at least one character string; and receiving the plurality of web pages based on the search query.

Example 5

In the method of any one of Examples 1 to 4, the at least one character string includes a plurality of words. In this example, generating the search query from the at least one character string includes selecting at least one word from the plurality of words based on at least one among character sizes, stroke widths, locations, types, and numbers of occurrences of the plurality of words in the image.

Example 6

In the method of any one of Examples 1 to 5, linking the thumbnail and the at least one web page includes linking the at least one web page and at least one portion associated with the at least one text region in the thumbnail.

Example 7

In the method of any one of Examples 1 to 6, selecting the at least one web page from the plurality of web pages includes selecting, from the plurality of web pages, the at least one web page having contents similar to contents of the image.

Example 8

In the method of any one of Examples 1 to 7, selecting the at least one web page having contents similar to the contents of the image includes assigning at least one rank to the plurality of web pages based on similarities between the contents of the image and contents of the plurality of web pages; and selecting the at least one web page based on the at least one rank.

Example 9

In the method of any one of Examples 1 to 8, selecting the at least one web page having contents similar to the contents of the image includes extracting a first feature indicative of the at least one text region in the image and a plurality of second features indicative of text in the plurality of web pages; and selecting the at least one web page based on the first feature and the plurality of second features.

Example 10

In the method of any one of Examples 1 to 9, linking the thumbnail of the image and the at least one web page includes linking a portion of the at least one web page to the thumbnail of the image. In this example, contents in the portion of the at least one web page are similar to contents in the image.

Example 11

According to another aspect of the present disclosure, there is provided an electronic device for linking a thumbnail of an image and at least one web page, including a text region detection unit configured to access the image in a storage unit, wherein the image includes at least one text region and detect the at least one text region in the image; a text recognition unit configured to recognize at least one character string in the at least one text region; a web page search unit configured to search a plurality of web pages based on the at least one character string; a web page selection unit configured to select the at least one web page from the plurality of web pages; and an image linking unit configured to link the thumbnail of the image and the at least one web page.

Example 12

The electronic device of Example 11 further includes an I/O unit configured to receive an input indicative of selection of the thumbnail and output the at least one web page on the electronic device. In this example, the at least one web page linked with the thumbnail is accessed by the electronic device.

Example 13

In the electronic device of Example 11 or 12, the electronic device is configured to access the at least one web page that is stored in the electronic device or searched via a network.

Example 14

In the electronic device of any one of Examples 11 to 13, the web page search unit includes a query generation unit configured to generate a search query from the at least one character string; and a web page fetching unit configured to receive the plurality of web pages based on the search query.

Example 15

In the electronic device of any one of Examples 11 to 14, the at least one character string includes a plurality of words. In this example, the query generation unit is configured to select at least one word from the plurality of words based on at least one among character sizes, stroke widths, locations, types, and numbers of occurrences of the plurality of words in the image.

Example 16

In the electronic device of any one of Examples 11 to 15, the image linking unit is configured to link the at least one web page and at least one portion associated with the at least one text region in the thumbnail.

Example 17

In the electronic device of any one of Examples 11 to 16, the web page selection unit is configured to select, from the plurality of web pages, the at least one web page having contents similar to contents of the image.

Example 18

In the electronic device of any one of Examples 11 to 17, the web page selection unit includes a rank assignment unit configured to assign at least one rank to the plurality of web pages based on similarities between the contents of the image and contents of the plurality of web pages; and a web page output unit configured to select the at least one web page based on the at least one rank.

Example 19

In the electronic device of any one of Examples 11 to 18, the web page selection unit includes a feature extraction unit configured to extract a first feature indicative of the at least one text region in the image and a plurality of second features indicative of text in the plurality of web pages; and a web page output unit configured to select the at least one web page based on the first feature and the plurality of second features.

Example 20

In the electronic device of any one of Examples 11 to 19, the image linking unit is configured to link a portion of the at least one web page to the thumbnail of the image. In this example, contents in the portion of the at least one web page are similar to contents in the image.

Example 21

According to still another aspect of the present disclosure, there is provided an electronic device for linking a thumbnail of an image to a web page, including means for accessing the image in a storage unit, wherein the image includes at least one text region; means for detecting the at least one text region in the image; means for recognizing at least one character string in the at least one text region; means for searching a plurality of web pages based on the at least one character string; means for selecting the at least one web page from the plurality of web pages; and means for linking the thumbnail of the image and the at least one web page.

Example 22

In the electronic device of Example 21, the means for searching the plurality of web pages includes means for generating a search query from the at least one character string; and means for receiving the plurality of web pages based on the search query.

Example 23

In the electronic device of Example 21 or 22, the at least one character string includes a plurality of words. In this example, the means for generating the search query from the at least one character string includes means for selecting at least one word from the plurality of words based on at least one among character sizes, stroke widths, locations, types, and numbers of occurrences of the plurality of words in the image.

Example 24

In the electronic device of any one of Examples 21 to 23, the means for selecting the at least one web page from the plurality of web pages includes means for selecting, from the plurality of web pages, the at least one web page having contents similar to contents of the image.

Example 25

In the electronic device of any one of Examples 21 to 24, the means for selecting the at least one web page having contents similar to the contents of the image includes means for assigning at least one rank to the plurality of web pages based on similarities between the contents of the image and contents of the plurality of web pages; and means for selecting the at least one web page based on the at least one rank.

Example 26

According to yet another aspect of the present disclosure, there is provided a non-transitory computer-readable storage medium including instructions causing at least a processor of an electronic device to perform operations of accessing an image in a storage unit, wherein the image includes at least one text region; detecting the at least one text region in the image; recognizing at least one character string in the at least one text region; searching a plurality of web pages based on the at least one character string; selecting at least one web page from the plurality of web pages; and linking a thumbnail of the image and the at least one web page.

Example 27

The non-transitory computer-readable storage medium of Example 26 further including instructions causing at least the processor of the electronic device to perform operations of generating a search query from the at least one character string; and receiving the plurality of web pages based on the search query.

Example 28

In the non-transitory computer-readable storage medium of Example 26 or 27, the at least one character string includes a plurality of words, and generating the search query from the at least one character string includes selecting at least one word from the plurality of words based on at least one among character sizes, stroke widths, locations, types, and numbers of occurrences of the plurality of words in the image.

Example 29

In the non-transitory computer-readable storage medium of any one of Examples 26 to 28, selecting the at least one web page from the plurality of web pages includes selecting, from the plurality of web pages, the at least one web page having contents similar to contents of the image

Example 30

In the non-transitory computer-readable storage medium of any one of Examples 26 to 29, selecting the at least one web page having contents similar to the contents of the image includes assigning at least one rank to the plurality of web pages based on similarities between the contents of the image and contents of the plurality of web pages; and selecting the at least one web page based on the at least one rank.

What is claimed:

1. A method, performed by an electronic device, for linking a thumbnail of an image and at least one web page, comprising:
generating the thumbnail of the image;
accessing the image, wherein the image comprises at least one text region;
detecting the at least one text region in the image;
recognizing at least one character string in the at least one text region;
initiating a web page search based on the at least one character string;
receiving a plurality of web page search results responsive to the web page search;
retrieving, by the electronic device, a plurality of web pages corresponding to the plurality of web page search results;
selecting, by the electronic device, the at least one web page from the plurality of web pages, based on the at least one web page having contents similar to contents of the image; and
linking, by the electronic device, the thumbnail of the image and the at least one web page.

2. The method of claim 1, further comprising:
receiving an input indicative of selection of the thumbnail;
accessing the at least one web page linked with the thumbnail; and
outputting the at least one web page on the electronic device.

3. The method of claim 2, wherein accessing the at least one web page comprises accessing the at least one web page that is stored in the electronic device or accessing the at least one web page via a network connection, and wherein the electronic device comprises a mobile device.

4. The method of claim 1, further comprising generating a search query from the at least one character string, wherein the web page search utilizes the search query to search a second plurality of web pages.

5. The method of claim 4, wherein the at least one character string comprises a plurality of words, and wherein generating the search query from the at least one character string comprises selecting at least one word from the plurality of words based on at least one among character sizes, stroke widths, locations, types, and numbers of occurrences of the plurality of words in the image.

6. The method of claim 1, wherein linking the thumbnail and the at least one web page comprises linking the at least one web page and at least one portion of the thumbnail.

7. The method of claim 1, wherein selecting the at least one web page from the plurality of web pages comprises selecting, from the plurality of web pages, the at least one web page based on one or more comparisons between the image and the plurality of web panes.

8. The method of claim 7, wherein selecting the at least one web page based on the one or more comparisons between the image and the plurality of web pages comprises:
assigning at least one rank to the plurality of web pages based on similarities between the contents of the image and contents of the plurality of web pages; and
selecting the at least one web page based on the at least one rank.

9. The method of claim 7, wherein selecting the at least one web page based on the one or more comparisons between the image and the plurality of web pages comprises:
extracting a first feature indicative of the at least one text region in the image and a plurality of second features indicative of text in the plurality of web pages; and
selecting the at least one web page based on the first feature and the plurality of second features.

10. The method of claim 1, wherein linking the thumbnail of the image and the at least one web page comprises linking a portion of the at least one web page to the thumbnail of the image, and wherein contents in the portion of the at least one web page are similar to contents in the image.

11. The method of claim 1, wherein accessing the image, detecting the at least one text region, recognizing the at least one character string, and initiating the web page search are performed by the electronic device, and wherein the electronic device comprises a mobile device.

12. The method of claim 1, further comprising performing comparisons, by the electronic device, between the at least one character string and each of the plurality of web pages, wherein the at least one web page is selected from the plurality of web pages based on the comparisons.

13. The method of claim 1, wherein linking the thumbnail and the at least one web page comprises:
generating a link to a uniform resource locator (URL) of the at least one web page; and
storing the link as metadata of the thumbnail of the image.

14. An electronic device for linking a thumbnail of an image and at least one web page, comprising:
a memory; and
a processor coupled to the memory, the processor configured to:
generate the thumbnail of the image;
access the image in a storage unit, wherein the image comprises at least one text region;
detect the at least one text region in the image;
recognize at least one character string in the at least one text region;
initiate a web page search based on the at least one character string;
receive a plurality of web page search results responsive to the web page search; and
retrieve a plurality of web pages corresponding to the plurality of web page search results;
select the at least one web page from the plurality of web pages, based on the at least one web page having contents similar to contents of the image; and
link the thumbnail of the image and the at least one web page.

15. The electronic device of claim 14, further comprising an I/O unit configured to receive an input indicative of selection of the thumbnail and output the at least one web page on the electronic device, wherein the at least one web page linked with the thumbnail is accessed by the electronic device, and wherein the electronic device is configured to access the at least one web page that is stored at the electronic device or to access the at least one web page via a network connection.

16. The electronic device of claim 14, wherein the processor is further configured to generate a search query from the at least one character string.

17. The electronic device of claim 16, wherein the at least one character string comprises a plurality of words, and wherein the processor is configured to select at least one word from the plurality of words based on at least one among character sizes, stroke widths, locations, types, and numbers of occurrences of the plurality of words in the image.

18. The electronic device of claim 14, wherein the processor is configured to link the at least one web page and at least one portion of the thumbnail.

19. The electronic device of claim 14, wherein the processor is configured to select, from the plurality of web pages, the at least one web page based on one or more comparisons between the image and the plurality of web pages.

20. The electronic device of claim 19, wherein the processor is further configured to assign at least one rank to the plurality of web pages based on similarities between the contents of the image and contents of the plurality of web pages and to select the at least one web page based on the at least one rank.

21. The electronic device of claim 19, wherein the processor is further configured to extract a first feature indicative of the at least one text region in the image and a plurality of second features indicative of text in the plurality of web pages and to select the at least one web page based on the first feature and the plurality of second features.

22. The electronic device of claim 14, wherein the processor is further configured to link a portion of the at least one web page to the thumbnail of the image, and wherein contents in the portion of the at least one web page are similar to contents in the image.

23. The electronic device of claim 14, further comprising:
an image sensor configured to capture the image;
an antenna;
a transmitter coupled to the antenna and configured to transmit data corresponding to a search query, the search query generated based on the at least one character string; and
a receiver coupled to the antenna and configured to receive second data corresponding to the plurality of web pages.

24. The electronic device of claim 23, wherein the memory includes the storage unit, and wherein the processor, the memory, the image sensor, the antenna, the transmitter, and the receiver are integrated into a mobile device.

25. An electronic device for linking a thumbnail of an image and at least one web page, comprising:
means for generating the thumbnail of the image;
means for accessing the image in a storage unit, wherein the image comprises at least one text region;
means for detecting the at least one text region in the image;
means for recognizing at least one character string in the at least one text region;
means for initiating a web page search based on the at least one character string;
means for receiving a plurality of web page search results responsive to the web page search and for retrieving a plurality of web pages corresponding to the plurality of web page search results;
means for selecting the at least one web page from the plurality of web pages based on the at least one web page having contents similar to contents of the image; and
means for linking the thumbnail of the image and the at least one web page.

26. The electronic device of claim 25, wherein the means for initiating a web page search comprises means for generating a search query from the at least one character string, wherein the plurality of web page search results are based on the search query.

27. The electronic device of claim 25, wherein the means for selecting the at least one web page comprises means for assigning at least one rank to the plurality of web pages based on similarities between the contents of the image and contents of the plurality of web pages, wherein the at least one web page is selected based on the at least one page rank.

28. A non-transitory computer-readable storage medium comprising instructions causing at least a processor of an electronic device to perform operations of:
generating a thumbnail of an image;
accessing the image in a storage unit, wherein the image comprises at least one text region;
detecting the at least one text region in the image;
recognizing at least one character string in the at least one text region;
initiating a web page search based on the at least one character string;
receiving a plurality of web page search results responsive to the web page search;
retrieving a plurality of web pages corresponding to the plurality of web page search results;
selecting at least one web page from the plurality of web pages based on the at least one web page having contents similar to contents of the image; and
linking the thumbnail of the image and the at least one web page.

29. The non-transitory computer-readable storage medium of claim 28, further comprising instructions causing at least the processor of the electronic device to perform operations of generating a search query from the at least one character string, wherein the at least one character string comprises a plurality of words, and wherein generating the search query from the at least one character string comprises selecting at least one word from the plurality of words based on at least one among character sizes, stroke widths, locations, types, and numbers of occurrences of the plurality of words in the image.

30. The non-transitory computer-readable storage medium of claim 28, wherein selecting the at least one web page comprises:
assigning at least one rank to the plurality of web pages based on similarities between contents of the image and contents of the plurality of web pages; and
selecting the at least one web page based on the at least one rank.

* * * * *